US012786989B2

(12) United States Patent
Medina Acosta et al.

(10) Patent No.: US 12,786,989 B2
(45) Date of Patent: Nov. 3, 2026

(54) LOWER AND HIGHER LAYER INTERACTIONS FOR PHYSICAL UPLINK SHARED CHANNEL REPETITION ADJUSTMENTS IN PRECONFIGURED UPLINK RESOURCES

(71) Applicant: Telefonaktiebolaget LM Ericsson (publ), Stockholm (SE)

(72) Inventors: Gerardo Agni Medina Acosta, Märsta (SE); Tuomas Tirronen, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 752 days.

(21) Appl. No.: 18/011,549

(22) PCT Filed: Jun. 28, 2021

(86) PCT No.: PCT/EP2021/067628
§ 371 (c)(1),
(2) Date: Dec. 20, 2022

(87) PCT Pub. No.: WO2022/002820
PCT Pub. Date: Jan. 6, 2022

(65) Prior Publication Data
US 2023/0262690 A1 Aug. 17, 2023

Related U.S. Application Data

(60) Provisional application No. 63/045,420, filed on Jun. 29, 2020.

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0008* (2013.01); *H04W 72/23* (2023.01); *H04W 76/20* (2018.02)

(58) Field of Classification Search
CPC . H04W 72/1268; H04W 72/23; H04W 76/20; H04L 1/0008
(Continued)

(56) References Cited

U.S. PATENT DOCUMENTS

2019/0373588 A1 12/2019 Bae et al.
2020/0092044 A1* 3/2020 Park ........................ H04L 1/189
2020/0358557 A1* 11/2020 Park .................... H03M 13/618

FOREIGN PATENT DOCUMENTS

JP 2019-220947 A 12/2019

OTHER PUBLICATIONS

Notice of Reasons for Rejection for Japanese Patent Application No. 2022-580743, including English translation, dated Jan. 30, 2024, 12 pages.

(Continued)

*Primary Examiner* — Asad M Nawaz
*Assistant Examiner* — Hugh Mark Ashley
(74) *Attorney, Agent, or Firm* — Weisberg I.P. Law, P.A.

(57) ABSTRACT

A method by a wireless device includes receiving, from the network node, a first message comprising a 3 bit indicator associated with a first number of Physical Uplink Shared Channel (PUSCH) repetitions to be used by the wireless device for a first instance of a PUSCH transmission. The wireless device receives a second message comprising a 2 bit indicator for determining a second number of PUSCH repetitions to be used by the wireless device for one or more subsequent instances of the PUSCH transmission based on said second number of PUSCH repetitions. The wireless device applies a zero-bit padding to the 2 bit indicator to
(Continued)

obtain an updated 3 bit indicator used to communicate from physical layer to higher layers the second number of PUSCH repetitions to be used and sends the one or more subsequent PUSCH transmissions based on the second number of PUSCH repetitions.

21 Claims, 18 Drawing Sheets

(51) Int. Cl.
*H04W 72/23* (2023.01)
*H04W 76/20* (2018.01)

(58) Field of Classification Search
USPC .......................................................... 370/329
See application file for complete search history.

(56) References Cited

OTHER PUBLICATIONS

Ericsson (Summary Rapporteur), "[ATT110-e][313] PUR Open Issues—Phase 2", Tdoc R2-2005940, 3GPP TSG-RAN WG2 Meeting #110-e, Jun. 1-12, 2020, 38 pages.

International Search Report and Written Opinion of the International Searching Authority, PCT/EP2021/067628, Oct. 14, 2021, 9 pages.

Ericsson (Summary Rapporteur) "[ATT110-e][313] PUR Open Issues—Phase 2", 3GPP Draft; R2-2005942, 3rd Generation Partnership Project (3GPP), Online, Jun. 1-12, 2020, 38 pages.

Qualcomm Incorporated: "Support for transmission in preconfigured UL resources", 3GPP Draft; R1-1910717, 3GPP TSG RAN WG1 Meeting #98b, Chongqing, China, Oct. 14-20, 2019, 10 pages.

Ad-hoc Chair (Samsung), "Chairman's notes of AI 6.2.1 Additional MTC Enhancements and AI 6.2.2 Additional Enhancements for NB-IoT", 3GPP TSG RAN WG1 Meeting #99, R1-190xxxx, Reno, USA, Nov. 18-22, 2019, 15 pages.

Ericsson, "Revised WID: Additional MTC enhancements for LTE", 3GPP TSG RAN Meeting #86, RP-192875, Sitges, Spain, Dec. 9-12, 2019, 5 pages.

Ad-hoc Chair (Samsung), "Chairman's notes of AI 6.2.1 Additional MTC Enhancements", 3GPP TSG RAN WG1 Meeting #94bis, R1-180xxxx, Chengdu, China, Oct. 8-12, 2018, 7 pages.

RAN2, "LS reply on PUR transmission for NB-IoT/eMTC", 3GPP TSG-RAN WG2 #110-e, R2-2005946, Online, Jun. 1-12, 2020, 2 pages.

* cited by examiner

LOWER AND HIGHER LAYER INTERACTIONS FOR PHYSICAL UPLINK SHARED CHANNEL REPETITION ADJUSTMENTS IN PRECONFIGURED UPLINK RESOURCES

CROSS REFERENCE TO RELATED APPLICATIONS

This application is a 35 U.S.C. § 371 national stage application of PCT International Application No. PPCT/EP2021/067628 filed on Jun. 28, 2021, which in turns claims domestic priority to U.S. Provisional Patent Application No. 63/045,420, filed on Jun. 29, 2020, the disclosures and content of which are incorporated by reference herein in their entirety.

TECHNICAL FIELD

The present disclosure relates, in general, to wireless communications and, more particularly, systems and methods for lower and high layer interactions for Physical Uplink Shared Channel (PUSCH) repetition adjustments in preconfigured uplink resources (PURs).

BACKGROUND

One of the objectives of the Release-16 Work Item (WI) on "Additional MTC enhancements for LTE" is to improve uplink (UL) transmission efficiency and/or power consumption for machine-type communications for Bandwidth-reduced Low-complexity or Coverage Enhanced User Equipments (BL/CE UEs). See, *RP*-192875, *Revised WID: Additional MTC enhancements for LTE*, RAN #86, Sitges, Spain, Dec. 9-12, 2019. Specifically, the WI seeks to specify support for transmission in preconfigured uplink resources (PURs) when the BL/CE UEs are in idle mode based on Single Carrier-Frequency Division Multiple Access (SC-FDMA) waveform for User Equipments (UEs) with a valid timing advance in RAN1, RAN2, and RAN4. The WI applies to both shared and dedicated resources and is limited to orthogonal (multi) access schemes.

During the 3GPP RAN1 #94bis meeting, RAN1 elaborated three definitions that will apply for the transmissions on preconfigured uplink resources (PUR). Specifically, it was agreed:

- Dedicated preconfigured UL resource is defined as an Physical Uplink Shared Channel (PUSCH) resource used by a single UE
  - PUSCH resource is time-frequency resource
  - Dedicated PUR is contention-free
- Contention-free shared preconfigured UL resource (CFS PUR) is defined as an PUSCH resource simultaneously used by more than one UE
  - PUSCH resource is at least time-frequency resource
  - CFS PUR is contention-free
- Contention-based shared preconfigured UL resource (CBS PUR) is defined as an PUSCH resource simultaneously used by more than one UE
  - PUSCH resource is at least time-frequency resource
  - CBS PUR is contention-based (CBS PUR may require contention resolution)

See, *Chairman's notes of AI* 6.2.1 *Additional MTC Enhancements, Source: Ad-hoc Chair* (*Samsung*), 3*GPP TSG RAN WG*1 *Meeting* #94*bis*, Chengdu, China, Oct. 8-12, 2018.

In RAN1 #94bis, it was agreed that "In idle mode, dedicated PUR is supported", and later in RAN1 #99, it was agreed to support CFS when the number of PUSCH repetitions is equal or lager than 32 repeats, and for at most 2 UE transmitting at the same time. See, *Chairman's notes of AI* 6.2.1 *Additional MTC Enhancements, Source: Ad-hoc Chair* (*Samsung*), 3*GPP TSG RAN WG*1 *Meeting* #99, *Reno*, Nev., USA, Nov. 18-22 2019.

The support of transmissions on PURs in IDLE mode is tied to the condition of being in possession of a valid Timing Advance (TA) and guaranteeing that it is still valid by the time the transmission on PURs is to be performed.

In response to a PUR transmission, the network node such as, for example, an eNodeB can reply using either Layer1 (L1) signaling or Layer2 (L2)/Layer3 (L3)-signaling:

- For L1-signaling, the network node uses an Acknowledgement (ACK)/Fallback indication where:
  - In case of indicating ACK, in addition of just acknowledging the reception of the UL transmission the TA can be updated and the number of PUSCH repetitions can be adjusted.
  - In case of indicating Fallback, in addition of just instructing the UE to perform a fallback to either Random Access Channel (RACH) or Early Data Transmission (EDT), the number of PUSCH repetitions can be adjusted.
  - In response to an unsuccessfully received transmission, the network node can schedule a retransmission by providing an "UL Grant" using L1-signaling.
- For L2/L3-signaling, the network node provides integrity protection and ensures the response from the network node has reached the right entity. In practice, a Radio Resource Control (RRC) message is used and it can be used for completing the procedure, i.e. acknowledging the reception of the UL transmissions or to perform a PUR reconfiguration, or to include downlink (DL) data.

PUR for Machine Type Communication (MTC) is supported in both Coverage Enhancement (CE) Modes A and B. With regard to CE Modes A and B, the technical specification 3GPP TR 36.300 states the following in clause 23.7b:

A UE in enhanced coverage is a UE that requires the use of enhanced coverage functionality to access the cell. In this release of the specification two enhanced coverage modes (mode A, mode B) are supported.

As stated in the above definition, there is a tight relation between the UE's location within the cell and the usage of the enhanced coverage functionality. FIG. 1 illustrates a normal coverage region, as well as outer regions where the UE requires to make use of the enhanced coverage functionality.

Prior to Rel-13, a two-step approach was used for selecting the number of PUSCH repetitions in both CE Mode A and B:

- Using Higher Layers, as step 1 the maximum number of PUSCH repetitions is broadcasted, which is associated to a set of values containing a selectable number of repetitions. The tables below illustrate the set of values available for CE Mode A and B respectively as defined in TS 36.213.

TABLE 8-2b

PUSCH repetition levels (DCI Format 6-0A)

| Higher layer parameter 'pusch-maxNumRepetitionCEmodeA' | [n1, n2, n3, n4} |
|---|---|
| Not configured | {1, 2, 4, 8} |
| 16 | {1, 4, 8, 16} |
| 32 | {1, 4, 16, 32} |

TABLE 8-2c

PUSCH repetition levels (DCI Format 6-0B)

| Higher layer parameter 'pusch-maxNumRepetitionCEmodeB' | {n1, n2, . . . , n8} |
|---|---|
| Not configured | {4, 8, 16, 32, 64, 128, 256, 512} |
| 192 | {1, 4, 8, 16, 32, 64, 128, 192} |
| 256 | {4, 8, 16, 32, 64, 128, 192, 256} |
| 384 | {4, 16, 32, 64, 128, 192, 256, 384} |
| 512 | {4, 16, 64, 128, 192, 256, 384, 512} |
| 768 | {8, 32, 128, 192, 256, 384, 512, 768} |
| 1024 | {4, 8, 16, 64, 128, 256, 512, 1024} |
| 1536 | {4, 16, 64, 256, 512, 768, 1024, 1536} |
| 2048 | {4, 16, 64, 128, 256, 512, 1024, 2048} |

Using Lower Layers, as step 2 one value among the ones in the set is selected through a bit combination given by the "Repetition number" field in the Downlink Control Information (DCI) Format 6-0A/B.

See, 3*GPP TS* 36.213*, "Evolved Universal Terrestrial Radio Access* (*E-UTRA*); *Physical layer procedures*", version 15.2.0.

In Rel-14, the possibility for a device to support a new range of PUSCH repetitions factors in CE Mode A was introduced. The new range included {1, 2, 4, 8, 12, 16, 24, 32}. In contrast to the two-step repetition adjustment approach, if the new range is configured via higher layers, the "Repetition number" field in DCI turns into 3-bits, which directly indicates the repetition number for PUSCH without having to refer to any table. The "Repetition number" field once the Rel-14 enhancement on the number of repeats was included as follows:

Repetition number—2 or 3 bits as defined in clause 8.0 The 3-bit field applies when ce-pdsch-puschEnhancement-config is configured by higher layers, otherwise the 2-bit field applies.

See, *Chairman's notes of AI* 6.2.1 *Additional MTC Enhancements, Source: Ad-hoc Chair* (*Samsung*), 3*GPP TSG RAN WG*1 *Meeting* #99, Reno, Nevada, USA, Nov. 18-22 2019.

In Rel-16, PUR makes use of the "Repetition number" field to adjust the number of repetition for PUSCH when the eNodeB responds with an "UL Grant." However, Rel-16 has also introduced a "PUSCH repetition adjustment" field to adjust the number of repetition for PUSCH when the eNodeB responds with an ACK/Fallback indicator.

In RRC specification TS 36.331 v.16.0.0, 3-bit fields are currently specified for repetition number configuration for both CE Mode A and CE Mode B for the "UL grant". The following is specified in information element (IE) PUR-Config (highlighting added):

```
PUR-PUSCH-Config-r16 : :=          SEQUENCE {
  pur-GrantInfo-r16                CHOICE {
    ce-ModeA                       SEQUENCE {
      numRUs-r16                     BIT STRING (SIZE(2)) ,
      prb-AllocationInfo-r16             BIT STRING (SIZE (10)),
      mcs-r16                        BIT STRING (SIZE(4)),
      numRepetitions-r16               BIT STRING (SIZE(3))
    },
    ce-ModeB                       SEQUENCE {
      subPRB-Allocation-r16            BOOLEAN,
      numRUs-r16                     BOOLEAN,
      prb-AllocationInfo-r16             BIT STRING (SIZE(8)),
      mcs-r16                        BIT STRING (SIZE (4)) ,
      numRepetitions-r16               BIT STRING (SIZE (3))
    }
  }  OPTIONAL,    -- Need ON
  pur-PUSCH-FreqHopping-r16          BOOLEAN,
  p0-UE-PUSCH-r16                  INTEGER (-8..7),
  alpha-r16                      Alpha-r12,
  pusch-CyclicShift-r16            INTEGER (0 .. 6)
}
```

See, 3*GPP TS* 36.331*, "Evolved Universal Terrestrial Radio Access* (*E-UTRA*); *Radio Resource Control* (*RRC*); Protocol specification", version 16.0.0.

Certain problems exist. For example, in Rel-16, PUR was introduced, which makes use of both the "Repetition number" field and the "PUSCH repetition adjustment" field to adjust the number of PUSCH repetitions under different circumstances.

Recently in RAN2 #110-e, it has been agreed that in principle the 3-bit fields in PUR-Config in RRC protocol will store the adjustments to the number of PUSCH repetitions in CE Mode A, which overlooks the fact that the there are two ways of changing the number of PUSCH repetitions. On one hand, the "PUSCH repetition adjustment" field consists of 2-bits, whereas for the "Repetition number" field either 2-bits or 3-bits apply depending on whether ce-pdsch-puschEnhancement-config is configured by higher layers. See, *R*2-2005946*, LS reply on PUR transmission for NB-IoT/eMTC,* 3*GPP TSG-RAN WG*2 #110-*e*, e-Meeting, 1-12 Jun. 2020.

Thus, there is a misalignment between the "3-bit string field" in RRC and the number of bits used by the "Repetition number" field and the "PUSCH repetition adjustment" field in DCI Format 6-0A. As a result, there is currently a misalignment between the lower and higher layer considering how the repetition adjustment update works. Additionally, another issue may be that the ce-pdsch-puschEnhancement-config is not currently supported by the "PUSCH repetition adjustment" field in DCI Format 6-0A.

SUMMARY

Certain aspects of the present disclosure and their embodiments may provide solutions to these or other challenges. For example, according to certain embodiments, methods are provided for dealing with the interactions between lower and higher layers for PUR in relation to the "Repetition number" field, the "PUSCH repetition adjustment", and the support of the larger range of PUSCH repetitions factors introduced in Rel-14. More specifically, methods are provided to resolve the misalignment between the "3-bit string field" in RRC and the number of bits used by the "Repetition number" field and the "PUSCH repetition adjustment" field in DCI Format 6-0A.

According to certain embodiments, a method by a wireless device includes receiving, from the network node, a first message comprising a 3 bit indicator associated with a first number of PUSCH repetitions to be used by the wireless device for a first instance of a PUSCH transmission. The wireless device receives a second message comprising a 2 bit indicator for determining a second number of PUSCH repetitions to be used by the wireless device for one or more subsequent instances of the PUSCH transmission based on said second number of PUSCH repetitions. The wireless device applies a zero-bit padding to the 2 bit indicator to obtain an updated 3 bit indicator used to communicate from physical layer to higher layers the second number of PUSCH repetitions to be used and sends the one or more subsequent PUSCH transmissions based on the second number of PUSCH repetitions.

According to certain embodiments, a wireless device includes processing circuitry configured to receive, from the network node, a first message comprising a 3 bit indicator associated with a first number of PUSCH repetitions to be used by the wireless device for a first instance of a PUSCH transmission. The processing circuitry is configured to receive a second message comprising a 2 bit indicator for determining a second number of PUSCH repetitions to be used by the wireless device for one or more subsequent instances of the PUSCH transmission based on said second number of PUSCH repetitions. The processing circuitry is configured to apply a zero-bit padding to the 2 bit indicator to obtain an updated 3 bit indicator used to communicate from physical layer to higher layers the second number of PUSCH repetitions to be used and sends the one or more subsequent PUSCH transmissions based on the second number of PUSCH repetitions.

According to certain embodiments, a method by a network node includes transmitting, to a wireless device, a first message comprising a 3 bit indicator associated with a first number of PUSCH repetitions to be used by the wireless device for a first instance of a PUSCH transmission. The network node transmits, to the wireless device, a second message comprising a 2 bit indicator for determining a second number of PUSCH repetitions to be used by the wireless device for one or more subsequent instances of the PUSCH transmission based on said second number of PUSCH repetitions. The network node then receives, from the wireless device, the one or more subsequent PUSCH transmissions based on the second number of PUSCH repetitions.

According to certain embodiments, a network node includes processing circuitry configured to transmit, to a wireless device, a first message comprising a 3 bit indicator associated with a first number of PUSCH repetitions to be used by the wireless device for a first instance of a PUSCH transmission. The processing circuitry is configured to transmit, to the wireless device, a second message comprising a 2 bit indicator for determining a second number of PUSCH repetitions to be used by the wireless device for one or more subsequent instances of the PUSCH transmission based on said second number of PUSCH repetitions. The processing circuitry then receives, from the wireless device, the one or more subsequent PUSCH transmissions based on the second number of PUSCH repetitions.

Certain embodiments may provide one or more of the following technical advantages. For example, one technical advantage may be that certain embodiments resolve the current misalignment between the lower layer ("Repetition number" field and the "PUSCH repetition adjustment" field in DCI Format 6-0A) and higher layer ("3-bit string field" in RRC) specifications. Another technical advantage may be that certain embodiments ensure proper UE implementation.

Another technical advantage may be that certain embodiments that use a 3-bit field in both lower layers (DCI) and higher layers (RRC) to handle the number of PUSCH repetitions leave the RRC specification unimpacted.

Another technical advantage may be that certain embodiments that use a 2-bit or 3-bit field in lower layers (DCI) and higher layers (RRC) to handle the update of PUSCH repetitions depending on has the advantage of letting the lower layer specifications unimpacted.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
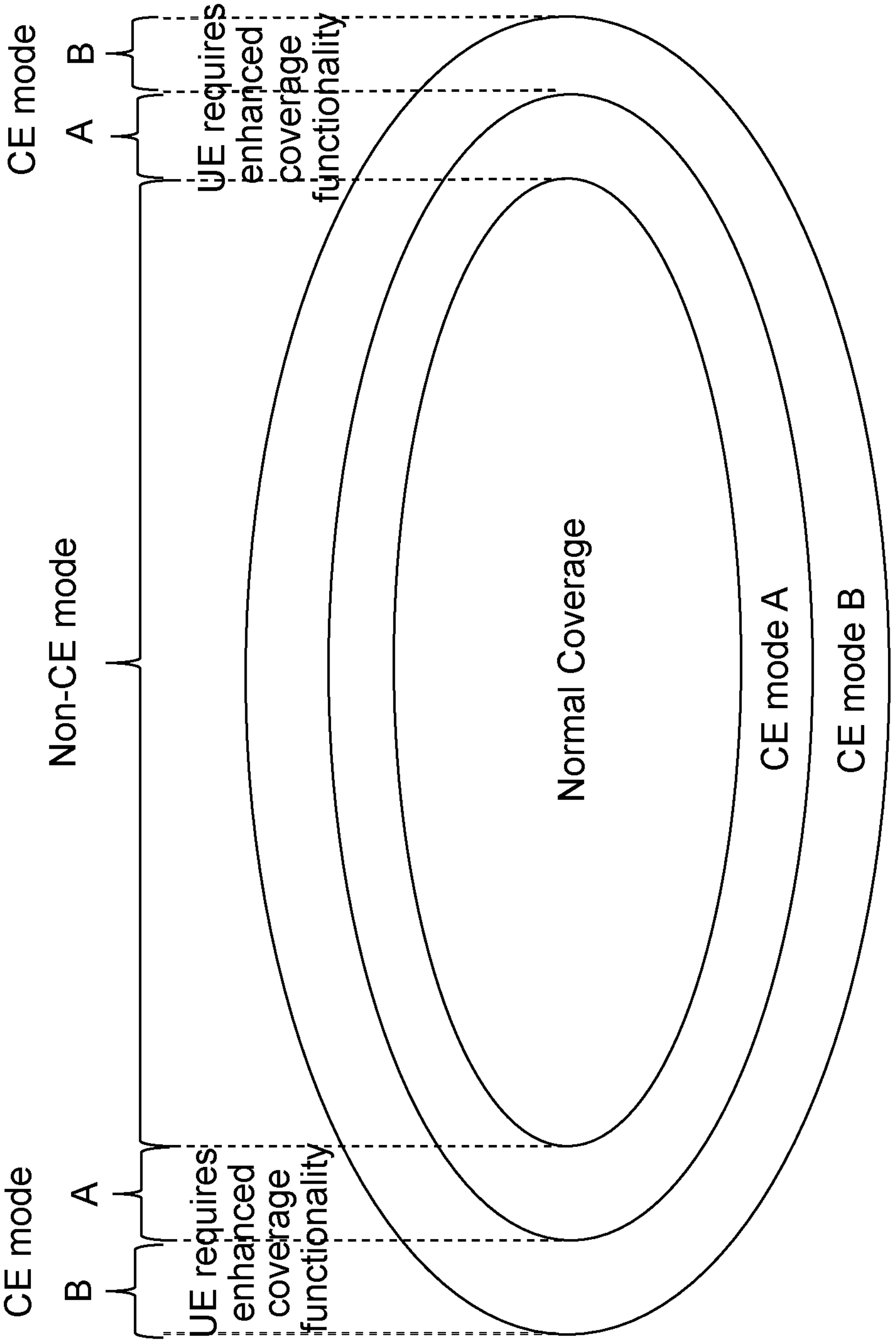
FIG. 1 illustrates a normal coverage region, as well as outer regions where the UE requires to make use of the enhanced coverage functionality

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, Master eNodeB (MeNB), a network node belonging to Master Cell Group (MCG) or Secondary Cell Group (SCG), base station (BS), multi-standard radio (MSR) radio node such as MSR BS, eNodeB (eNB), gNodeB (gNB), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations and Maintenance (O&M), Operations Support System (OSS), Self Organizing Network (SON), positioning node (e.g. Evolved-Serving Mobile Location Centre (E-SMLC)), Minimization of Drive Tests (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Unified Serial Bus (USB) dongles, UE category M1, UE category M2, Proximity Services (ProSe) UE, Vehicle-to-Vehicle (V2V) UE, Vehicle-to-Anything (V2X) UE, etc.

Additionally, terminologies such as base station/gNB and UE should be considered non-limiting and do in particular not imply a certain hierarchical relation between the two; in general, "gNB" could be considered as device 1 and "UE" could be considered as device 2 and these two devices communicate with each other over some radio channel. And in the following the transmitter or receiver could be either gNB, or UE.

Lower and Higher Layer Interactions for PUSCH Repetition Adjustments Using PUR According with the agreements reached in RAN2 #110-e, a single 3-bit string field in RRC protocol will store the adjustments to the number of PUSCH repetitions in CE Mode A. However, as discussed above, PUR in the lower layers makes use of two different fields to change the number PUSCH repetitions. On one hand, the "PUSCH repetition adjustment" field consisting of 2-bits is used along with the L1-ACK/Fallback indication. On the other, the "Repetition number" field is used when the eNode schedules a retransmission and can use either 2-bits or 3-bits depending on whether ce-pdsch-puschEnhancement-config is configured by higher layers.

According to certain embodiments, methods are provided for dealing with the interactions between lower and higher layers for PUR in relation to the "Repetition number" field, the "PUSCH repetition adjustment" field, and the support of the larger range of PUSCH repetitions factors introduced in Rel-14. More specifically, methods are provided to resolve the misalignment between the "3-bit string field" in RRC and the number of bits used by the "Repetition number" field and the "PUSCH repetition adjustment" field in DCI Format 6-0A.

According to certain embodiments, two approaches are provided:

- A 3-bit field in both Lower Layers (DCI) and Higher Layers (RRC) handles the updates on the number of PUSCH repetitions, including:
  - Case 1: PUR when ce-pdsch-puschEnhancement-config is not configured by HL
  - Case 2: PUR when ce-pdsch-puschEnhancement-config is configured by HL
    - Alt-1: when ce-pdsch-puschEnhancement-config is NOT supported by the L1 ACK/Fallback indicator.
    - Alt-2: when ce-pdsch-puschEnhancement-config is supported by the L1 ACK/Fallback indicator
- A ⅔-bit field in both Lower Layers (DCI) and Higher Layers (RRC) handles the updates on the number of PUSCH repetitions, including:
  - Case 1: PUR when ce-pdsch-puschEnhancement-config is not configured by HL
  - Case 2: PUR when ce-pdsch-puschEnhancement-config is configured by HL
    - Alt-1: when ce-pdsch-puschEnhancement-config is NOT supported by the L1 ACK/Fallback indicator.
    - Alt-2: when ce-pdsch-puschEnhancement-config is supported by the L1 ACK/Fallback indicator The two approaches are discussed in more detail below.

3-Bit Field is Used in Both Lower Layers (DCI) and Higher Layers (RRC) to Handle the Number of PUSCH Repetitions In 3GPP TS 36.331, a 3-bit field has been specified to handle the adjustments on the number of PUSCH repetitions for PUR in CE Mode A.

However, as explained above, PUR in the lower layers makes use of two different fields to change the number PUSCH repetitions. The sections below describe solutions following an approach in which the misalignment between the higher and lower layers is resolved by making the lower layers to always use a 3-bit field.

In all of the approaches, in an embodiment when the misalignment has been resolved by either using 3-bits or ⅔-bits the lower layers, an indication is provided to higher layers (i.e. RRC layer), which then further takes into account the provided information when updating the configuration in RRC.

Case 1: PUR when Ce-Pdsch-puschEnhancement-Config is not Configured by Higher Layers According with the current specifications, when ce-pdsch-puschEnhancement-config is not configured by higher layers, the "PUSCH repetition adjustment" field consists of 2-bits, whereas for the "Repetition number" field 2-bits applies. However, if a 3-bit field were always used to avoid the misalignment, a rule needs to be added in the specifications to perform a padding to pass from 2-bits to 3-bits. Alternatively, a new "PUSCH repetition levels (DCI Format 6-0A)" Table consisting of 3-bits may be created. Both options are described below:

Option 1: Bit Padding Solution

When ce-pdsch-puschEnhancement-config is not configured by higher layers, both the "PUSCH repetition adjustment" and the "Repetition number" can keep using 2-bits if a sentence is added to the technical specifications stating that when a transmission is performed using PURs a zero-bit padding is used to match the 3-bits that apply for the DCI fields.

For example, the "zero-bit padding" statement can be added in 3GPP TS 36.213 in clause 8.0 as follows:

If the UE is configured with higher layer parameter ce-pdsch-puschEnhancement-config with value 'On' n1, n2, . . . $n_{max}$ are given by {1, 2, 4, 8, 12, 16, 24, 32}, Otherwise, n1, n2, . . . $n_{max}$ are given in Table 8-2b and Table 8-2c, in case of PUSCH transmission using preconfigured uplink resource for Table 8-2b zero-bit padding is applied to match the 3-bits in the DCI field.

On the other hand, in 3GPP TS 36.212 clause 5.3.3, the DCI could, for example, be updated as follows, where the underlined portion represents the instructions that apply for PUR when ce-pdsch-puschEnhancement-config is not configured by HL. Notice that in the following tables, reference [3] refers to 3GPP TS 36.213.

TABLE 1a

| 3-bit solution using Option 1 when ce-pdsch-puschEnhancement-config is not configured by higher layers. 3-bit solution (i.e., Always 3-bits) Option 1 incorporated to DCI Format 6-0A |
|---|
| - PUSCH repetition adjustment - 2 or 3 bits as defined in clause 8.0 [3]. The 3-bit field applies as defined in Table 8-2b [3] using zero-bit padding when DCI format 6-0A CRC is scrambled by PUR C-RNTI. |
| ---------------------------------------- Text Omitted ------------------------------------------------ |
| - Repetition number - 2 or 3 bits as defined in clause 8.0 [3]. The 3-bit field applies: ~~when~~ |
| As defined in clause 8.0 [3] for ce-pdsch-puschEnhancement-config if it is configured by higher layers [Comment]: As long as ce-pdsch-puschEnhancement-config is configured by higher layers, this applies regardless of whether PUR is being used or not. |
| - As defined in Table 8-2b [3] using zero-bit padding if ce-pdsch-puschEnhancement-config is not configured by higher layers and DCI format 6-0A CRC is scrambled by PUR C-RNTI |
| - Otherwise the 2-bit field applies. |

See, Chairman's notes of AI 6.2.1 Additional MTC Enhancements, Source: Ad-hoc Chair (Samsung), 3GPP TSG RAN WG1 Meeting #99, Reno, Nevada, USA, Nov. 18-22 2019.

Option 2: New 3-Bit "PUSCH Repetition Levels (DCI Format 6-0A)" Table Solution

According to certain embodiments, a new "PUSCH repetition levels (DCI Format 6-0A)" Table may be added to 3GPP TS 36.213. An example of one such table is shown below:

TABLE 8-2b-1

PUSCH repetition levels (DCI Format 6-0A)

| Higher layer parameter 'pusch-maxNumRepetitionCEmodeA' | {n1, n2, n3, n4, n5, n6, n7, n8} |
|---|---|
| Not configured | {1, 2, 4, 8, reserved, reserved, reserved, reserved} |
| 16 | {1, 4, 8, 16, reserved, reserved, reserved, reserved} |
| 32 | {1, 4, 16, 32, reserved, reserved, reserved, reserved} |

According to certain embodiments, in DCI Format 6-0A, both the "PUSCH repetition adjustment" field and the "Repetition number" field may be additionally updated to make both point to the NEW Table 8-2b-1 shown above. That is:

In case of L1 ACK/Fallback indicator:

PUSCH repetition adjustment—3 bits pointing to a NEW Table 8-2b-1: PUSCH repetition levels (DCI Format 6-0A)

In case of UL-Grant:

Repetition number—3 bits pointing to a NEW Table 8-2b-1: PUSCH repetition levels (DCI Format 6-0A)

An example on how DCI Format 6-0A in 3GPP TS 36.212 may be updated (for illustration purposes only) is shown below. The underlined statements are the ones that apply to Case 1 (i.e., PUR when ce-pdsch-puschEnhancement-config is not configured by HL):

TABLE 1b

| 3-bit solution using Option 2 when ce-pdsch-puschEnhancement-config is not configured by HL<br>3-bit solution (i.e., Always 3-bits) Option 2 incorporated to DCI Format 6-0A |
|---|
| - PUSCH repetition adjustment - 2 or 3 bits as defined in clause 8.0 [3]. The 3-bit field applies as defined in Table 8-2b-1 [3] when DCI format 6-0A CRC is scrambled by PUR C-RNTI.<br>-------------------------------------------------- Text Omitted -------------------------------------------------<br>- Repetition number - 2 or 3 bits as defined in clause 8.0 [3]. The 3-bit field applies:~~when~~<br>- As defined in clause 8.0 [3] for ce-pdsch-puschEnhancement-config if it is configured by higher layers [Comment]: As long as ce-pdsch-puschEnhancement-config is configured by higher layers, this applies regardless of whether PUR is being used or not.<br>As defined in Table 8-2b-1 [3] if ce-pdsch-puschEnhancement-config is not configured by higher layers and DCI format 6-0A CRC is scrambled by PUR C-RNTI<br>- Otherwise the 2-bit field applies. |

See, *Chairman's notes of AI* 6.2.1 *Additional MTC Enhancements, Source: Ad-hoc Chair* (*Samsung*), 3*GPP TSG RAN WG*1 *Meeting* #99, Reno, Nevada, USA, Nov. 18-22 2019.

Case 2: PUR when Ce-Pdsch-puschEnhancement-Config is Configured by Higher Layers In case the L1-ACK/Fallback indicator (i.e., "PUSCH repetition adjustment" field) continues to not support the ce-pdsch-puschEnhancement-config, then the updates in the DCI Format 6-0A may look similar to those described above for Case 1. A difference may be that the underlined statements would change as to exemplify the instructions that will be followed for Case 2.

Option 1:

TABLE 2a

| 3-bit solution using Option 1 when ce-pdsch-puschEnhancement-config is configured by higher layers and the L1-ACK/Fallback indicator does not support it.<br>3-bit solution (i.e., Always 3-bits) Option 1 incorporated to DCI Format 6-0A |
|---|
| - PUSCH repetition adjustment - 2 or 3 bits as defined in clause 8.0 [3]. The 3-bit field applies as defined in Table 8-2b [3] using zero-bit padding when DCI format 6-0A CRC is scrambled by PUR C-RNTI.<br>-------------------------------------------------- Text Omitted -------------------------------------------------<br>Repetition number - 2 or 3 bits as defined in clause 8.0 [ ]. The 3-bit field applies: ~~when~~<br>- As defined in clause 8.0 [3] for ce-pdsch-puschEnhancement-config if it is configured by higher layers [Comment]: As long as ce-pdsch-puschEnhancement-config is configured by higher layers, this applies regardless of whether PUR is being used or not.<br>- As defined in Table 8-2b [3] using zero-bit padding if ce-pdsch-puschEnhancement-config is not configured by higher layers and DCI format 6-0A CRC is scrambled by PUR C-RNTI<br>- Otherwise the 2-bit field applies. |

See, *Chairman's notes of AI* 6.2.1 *Additional MTC Enhancements, Source: Ad-hoc Chair* (*Samsung*), 3*GPP TSG RAN WG*1 *Meeting* #99, Reno, Nevada, USA, Nov. 18-22 2019.

Option 2:

TABLE 2b

| 3-bit solution using Option 2 when ce-pdsch-puschEnhancement-config is configured by higher layers and the L1-ACK/Fallback indicator does not support it.<br>3-bit solution (i.e., Always 3-bits) Option 2 incorporated to DCI Format 6-0A |
|---|
| - PUSCH repetition adjustment - 2 or 3 bits as defined in clause 8.0 [3]. The 3-bit field applies as defined in Table 8-2b-1 [3] when DCI format 6-0A CRC is scrambled by PUR C-RNTI.<br>-------------------------------------------------- Text Omitted -------------------------------------------------<br>- Repetition number - 2 or 3 bits as defined in clause 8.0 [3]. The 3-bit field applies: ~~when~~ |

TABLE 2b-continued

| 3-bit solution using Option 2 when ce-pdsch-puschEnhancement-config is configured by higher layers and the L1-ACK/Fallback indicator does not support it. 3-bit solution (i.e., Always 3-bits) Option 2 incorporated to DCI Format 6-0A |
|---|
| - As defined in clause 8.0 [3] for ce-pdsch-puschEnhancement-config if it is configured by higher layers [Comment]: As long as ce-pdsch-puschEnhancement-config is configured by higher layers, this applies regardless of whether PUR is being used or not.<br>- As defined in Table 8-2b-1 [3] if ce-pdsch-puschEnhancement-config is not configured by higher layers and DCI format 6-0A CRC is scrambled by PUR C-RNTI<br>- Otherwise the 2-bit field applies. |

In case the L1-ACK/Fallback indicator (i.e., "PUSCH repetition adjustment" field) were updated to support the ce-pdsch-puschEnhancement-config, the DCI Format 6-0A may be modified as described below where the underlined instructions to be followed in this case are also updated:

Option 1:

TABLE 3a

| 3-bit solution using Option 1 when ce-pdsch-puschEnhancement-config is configured by higher layers and the L1-ACK/Fallback indicator does support it. 3-bit solution (i.e., Always 3-bits) Option 1 incorporated to DCI Format 6-0A |
|---|
| - PUSCH repetition adjustment - 2 or 3 bits as defined in clause 8.0 [3]. The 3-bit field applies: ~~when~~<br>- As defined in clause 8.0 [3] for ce-pdsch-puschEnhancement-config if it is configured by higher layers [Comment]: As long as ce-pdsch-puschEnhancement-config is configured by higher layers, this applies regardless of whether PUR is being used or not.<br>- As defined in Table 8-2b [ ] using zero-bit padding if ce-pdsch-puschEnhancement-config is not configured by higher layers and DCI format 6-0A CRC is scrambled by PUR C-RNTI<br>- Otherwise the 2-bit field applies.<br>---------------------------------------------- Text Omitted ------------------------------------------------------<br>- Repetition number - 2 or 3 bits as defined in clause 8.0 [3]. The 3-bit field applies: ~~when~~<br>- As defined in clause 8.0 [3] for ce-pdsch-puschEnhancement-config if it is configured by higher layers [Comment]: As long as ce-pdsch-puschEnhancement-config is configured by higher layers, this applies regardless of whether PUR is being used or not.<br>- As defined in Table 8-2b [3] using zero-bit padding if ce-pdsch-puschEnhancement-config is not configured by higher layers and DCI format 6-0A CRC is scrambled by PUR C-RNTI<br>- Otherwise the 2-bit field applies. |

Option 2:

TABLE 3b

| 3-bit solution using Option 2 when ce-pdsch-puschEnhancement-config is configured by higher layers and the L1-ACK/Fallback indicator does support it. 3-bit solution (i.e., Always 3-bits) Option 2 incorporated to DCI Format 6-0A |
|---|
| - PUSCH repetition adjustment - 2 or 3 bits as defined in clause 8.0 [3]. The 3-bit field applies: ~~when~~<br>- As defined in clause 8.0 [3] for ce-pdsch-puschEnhancement-config if it is configured by higher layers [Comment]: As long as ce-pdsch-puschEnhancement-config is configured by higher layers, this applies regardless of whether PUR is being used or not.<br>- As defined in Table 8-2b-1 [3] if ce-pdsch-puschEnhancement-config is not configured by higher layers and DCI format 6-0A CRC is scrambled by PUR C-RNTI<br>- Otherwise the 2-bit field applies.<br>---------------------------------------------- Text Omitted ------------------------------------------------------<br>- Repetition number - 2 or 3 bits as defined in clause 8.0 [3]. The 3-bit field applies: ~~when~~ As defined in clause 8.0 [3] for ce-pdsch-puschEnhancement-config if it is configured by higher layers [Comment]: As long as ce-pdsch-puschEnhancement-config is configured by higher layers, this applies regardless of whether PUR is being used or not. |

TABLE 3b-continued

| 3-bit solution using Option 2 when ce-pdsch-puschEnhancement-config is configured by higher layers and the L1-ACK/Fallback indicator does support it. 3-bit solution (i.e., Always 3-bits) Option 2 incorporated to DCI Format 6-0A |
| --- |
| - As defined in Table 8-2b-1 [3] if ce-pdsch-puschEnhancement-config is not configured by higher layers and DCI format 6-0A CRC is scrambled by PUR C-RNTI<br>- Otherwise the 2-bit field applies. |

A ⅔-Bit Field is Used in Both Lower Layers (DCI) and Higher Layers (RRC) to Handle the Number of PUSCH Repetitions According to certain other embodiments, the 2-bits of the "PUSCH repetition adjustment" field and the variable number of bits in the "Repetition number" field (i.e., 2-bits or 3-bits depending on whether ce-pdsch-puschEnhancement-config is configured by higher layers) may be preserved. In a particular embodiment, for example, the lower layers may provide indication or the value of the 2-bit or 3-bit fields to higher layers. The higher layers may then further take the information into account when updating the configuration. The exact method may depend on whether 2- or 3-bit field was used. That is, in this alternative the modifications may occur in the RRC layer, e.g. in specification 3GPP TS 36.331 as to let the DCI fields in Format 6-0A remain unmodified (except perhaps for adding support for in the case of the "PUSCH repetition adjustment" field).

The modifications in RRC may allow either 2-bits or 3-bits to be used by, for example, using a "3-bit string field" and a "2-bit string field", which would be selectable depending on whether ce-pdsch-puschEnhancement-config has been configured. In this approach, a new configuration in RRC information element is specified for CE Mode A for the cases where 2-bit indication is provided from lower layers (i.e. physical layer) to higher layers (i.e. RRC layer). The configuration of whether 2-bit or 3-bit field is used may be conditional on whether ce-pdsch-puschEnhancement-config is applicable to CE Mode A repetition adjustment and whether it is configured or not.

Another approach may consist of keeping a single "3-bit string field" for the repetition number in the RRC configuration (as it is now), where this field may be updated regardless of whether a 2-bit or 3-bit indication is received from lower layers, that is, depending on whether ce-pdsch-puschEnhancement-config has or has not been configured and whether it applies to the repetition update for CE Mode A. For this latter approach, the RRC specification may be updated to specify how 2-bit information is used to update the 3-bit field such as, for example, by always setting the most significant bit (MSB) to zero or alternatively by setting the least significant bit (LSB) to zero.

Example instructions to be followed in DCI Format 6-0A depending on whether ce-pdsch-puschEnhancement-config is configured or not by higher layers and depending on whether it is supported or not by the L1 ACK/Fallback indicator (i.e., "PUSCH repetition adjustment" field).

Case 1: PUR when Ce-Pdsch-puschEnhancement-Config is not Configured by Higher Layers According to certain embodiments, the DCI Format 6-0A may remain unmodified when ce-pdsch-puschEnhancement-config is not configured by higher layers.

TABLE 4

| 2/3-bit solution when ce-pdsch-puschEnhancement-config is not configured by HL 2/3-bit solution (i.e., 2-bits combined with the usage of 3-bits when applicable) in DCI Format 6-0A |
| --- |
| - PUSCH repetition adjustment - 2 bits as defined in clause 8.0 [3]<br>---------------------------------------------- Text Omitted -------------------------------------------------<br>- Repetition number - 2 or 3 bits as defined in clause 8.0 [3]. The 3-bit field applies when ce-pdsch-puschEnhancement-config is configured by higher layers, otherwise the 2-bit field applies. |

Case 2: PUR when Ce-Pdsch-puschEnhancement-Config is Configured by Higher Layers Alt-1: when ce-pdsch-puschEnhancement-config is NOT supported by the L1 ACK/Fallback indicator.

When ce-pdsch-puschEnhancement-config is configured but is NOT supported by the L1 ACK/Fallback indicator, the DCI Format 6-0A remains unmodified. Below the statements to be followed in this case are underlined.

TABLE 5

| 2/3-bit solution when ce-pdsch-puschEnhancement-config is configured by higher layers and the L1-ACK/Fallback indicator does not support it. 2/3-bit solution (i.e., 2-bits combined with the usage of 3-bits when applicable) in DCI Format 6-0A |
| --- |
| - PUSCH repetition adjustment - 2 bits as defined in clause 8.0 [3]<br>---------------------------------------------- Text Omitted ------------------------------------------------<br>- Repetition number - 2 or 3 bits as defined in clause 8.0 [3]. The 3-bit field applies when ce-pdsch-puschEnhancement-config is configured by higher layers, otherwise the 2-bit field applies. |

Alt-2: when ce-pdsch-puschEnhancement-config is supported by the L1 ACK/Fallback indicator When ce-pdsch-puschEnhancement-config is configured and is supported by the L1 ACK/Fallback indicator, the DCI Format 6-0A suffers a modification on the "PUSCH repetition adjustment field". Below the statements to be followed in this case are underlined.

TABLE 6

| 2/3-bit solution when ce-pdsch-puschEnhancement-config is configured by HL and the L1-ACK/Fallback indicator does support it. 2/3-bit solution (i.e., 2-bits combined with the usage of 3-bits when applicable) in DCI Format 6-0A |
|---|
| - PUSCH repetition adjustment - 2 or 3 bits as defined in clause 8.0 [3]. The 3-bit field applies when ce-pdsch-puschEnhancement-config is configured by higher layers, otherwise the 2-bit field applies. |
| ---------------------------------------------- Text Omitted ------------------------------------------------- |
| - Repetition number - 2 or 3 bits as defined in clause 8.0 [3]. The 3-bit field applies when ce-pdsch-puschEnhancement-config is configured by higher layers, otherwise the 2-bit field applies. |

Figure 2:
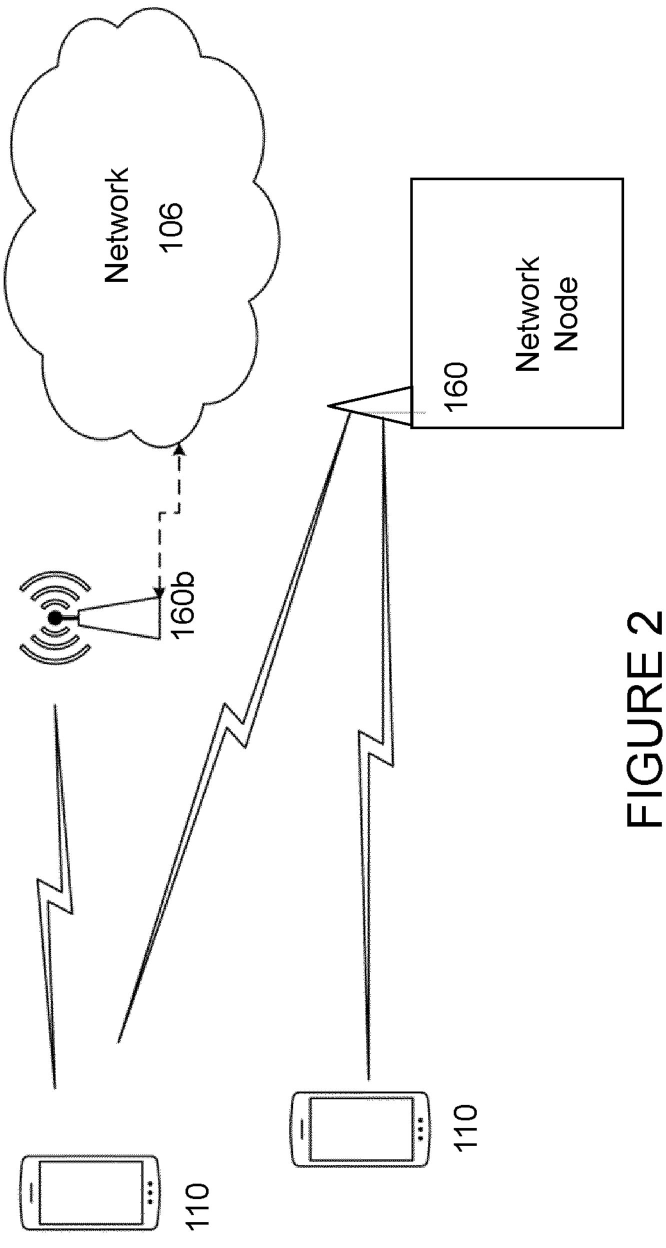
FIG. 2 illustrates an example wireless network, according to certain embodiments.

FIG. 2 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160*b*, and wireless devices 110. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 3:
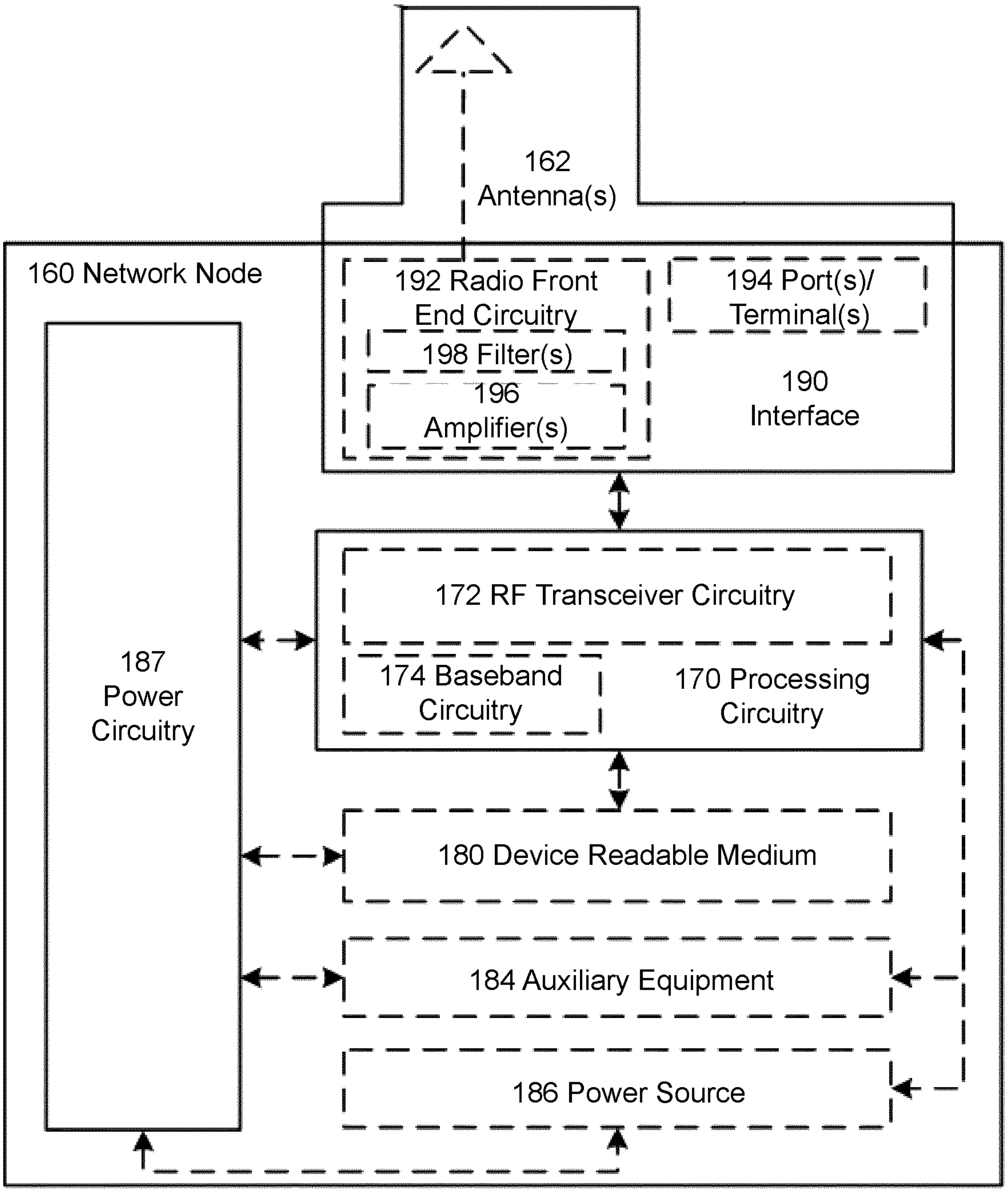
FIG. 3 illustrates an example network node, according to certain embodiments.

FIG. 3 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 4:
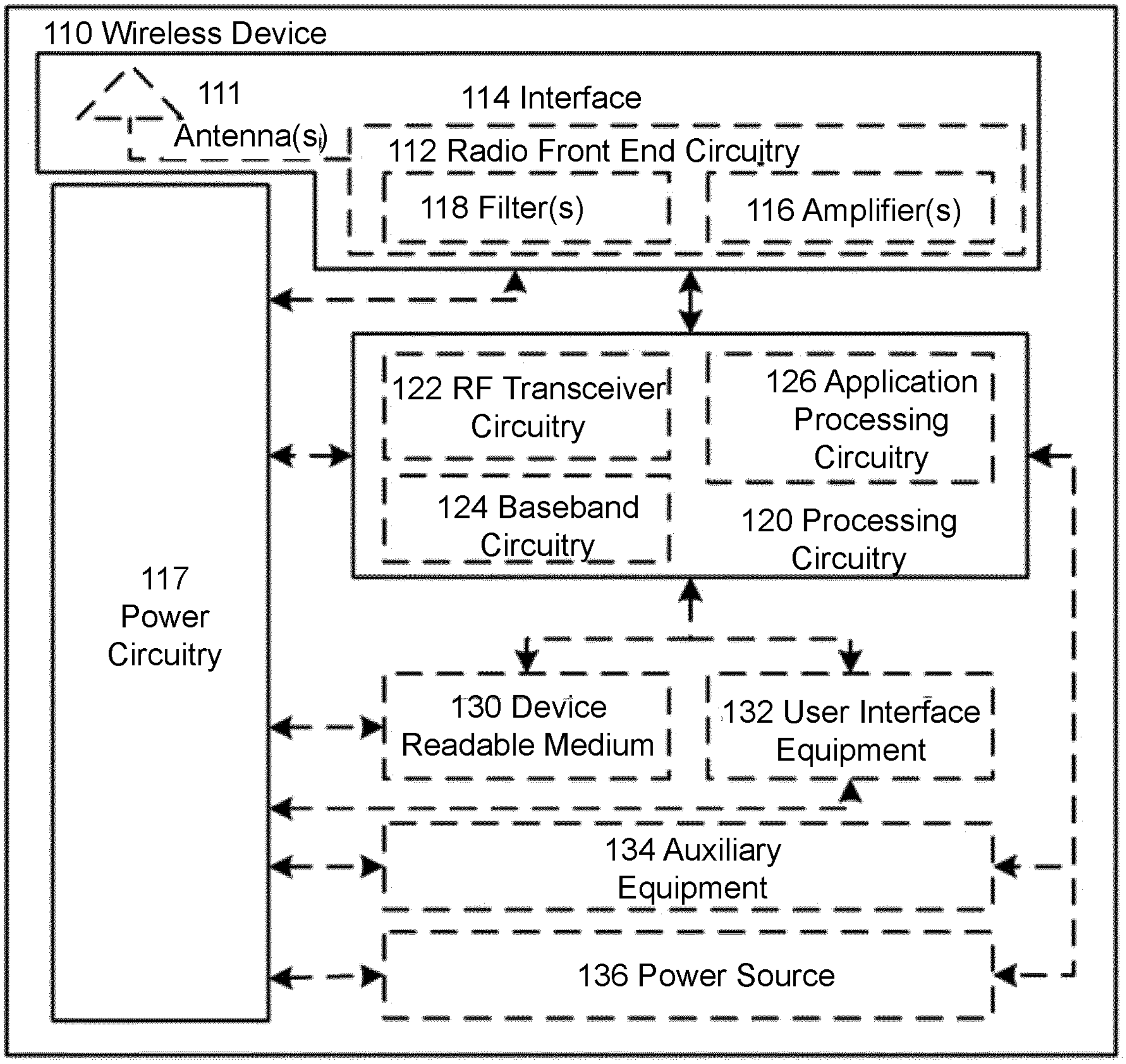
FIG. 4 illustrates an example wireless device, according to certain embodiments.

FIG. 4 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 5:
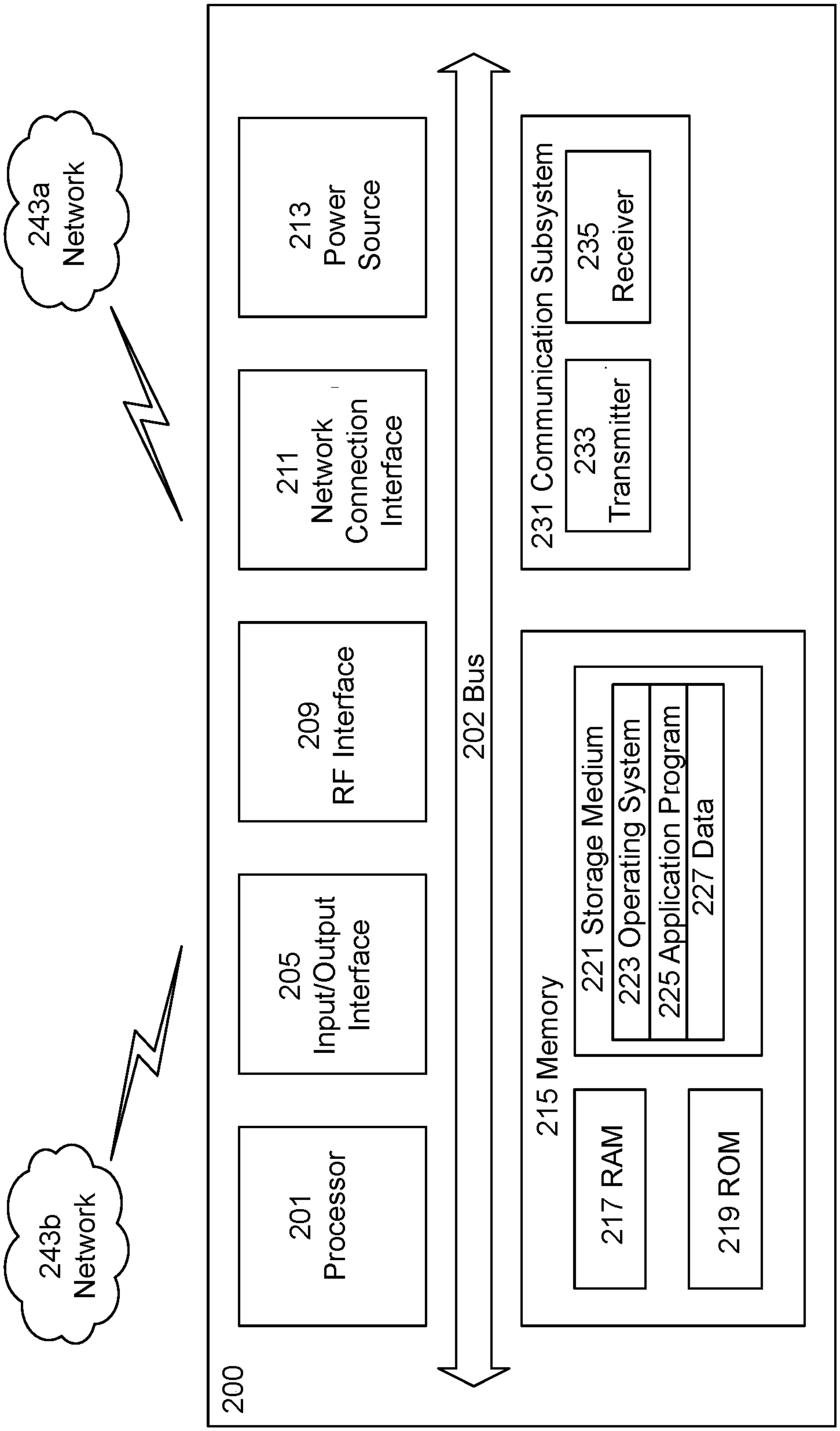
FIG. 5 illustrate an example UE, according to certain embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 3, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 5 is a UE, the components discussed herein are equally applicable to a wireless device, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
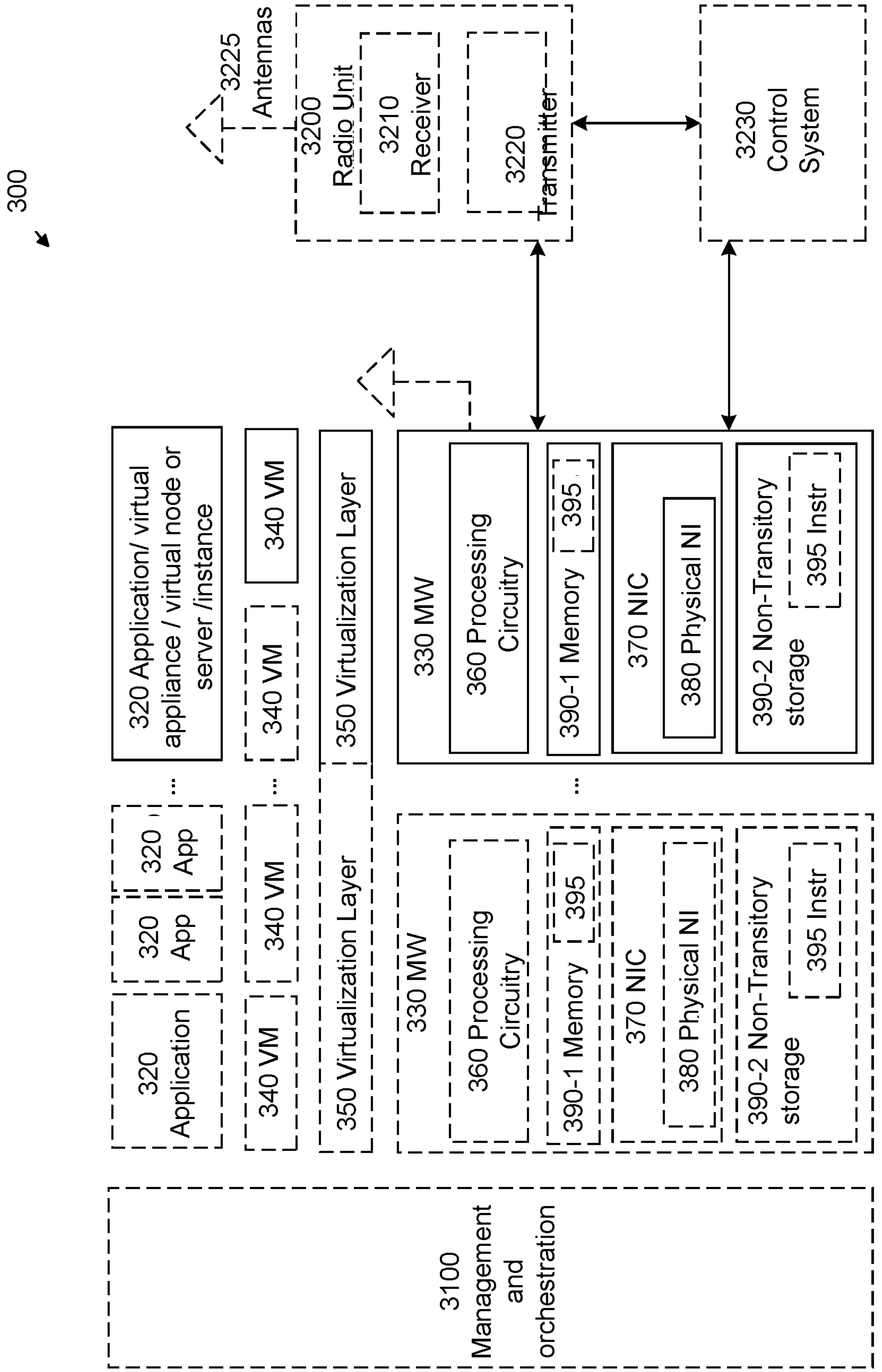
FIG. 6 illustrates a virtualization environment in which functions implemented by some embodiments may be virtualized, according to certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 7:
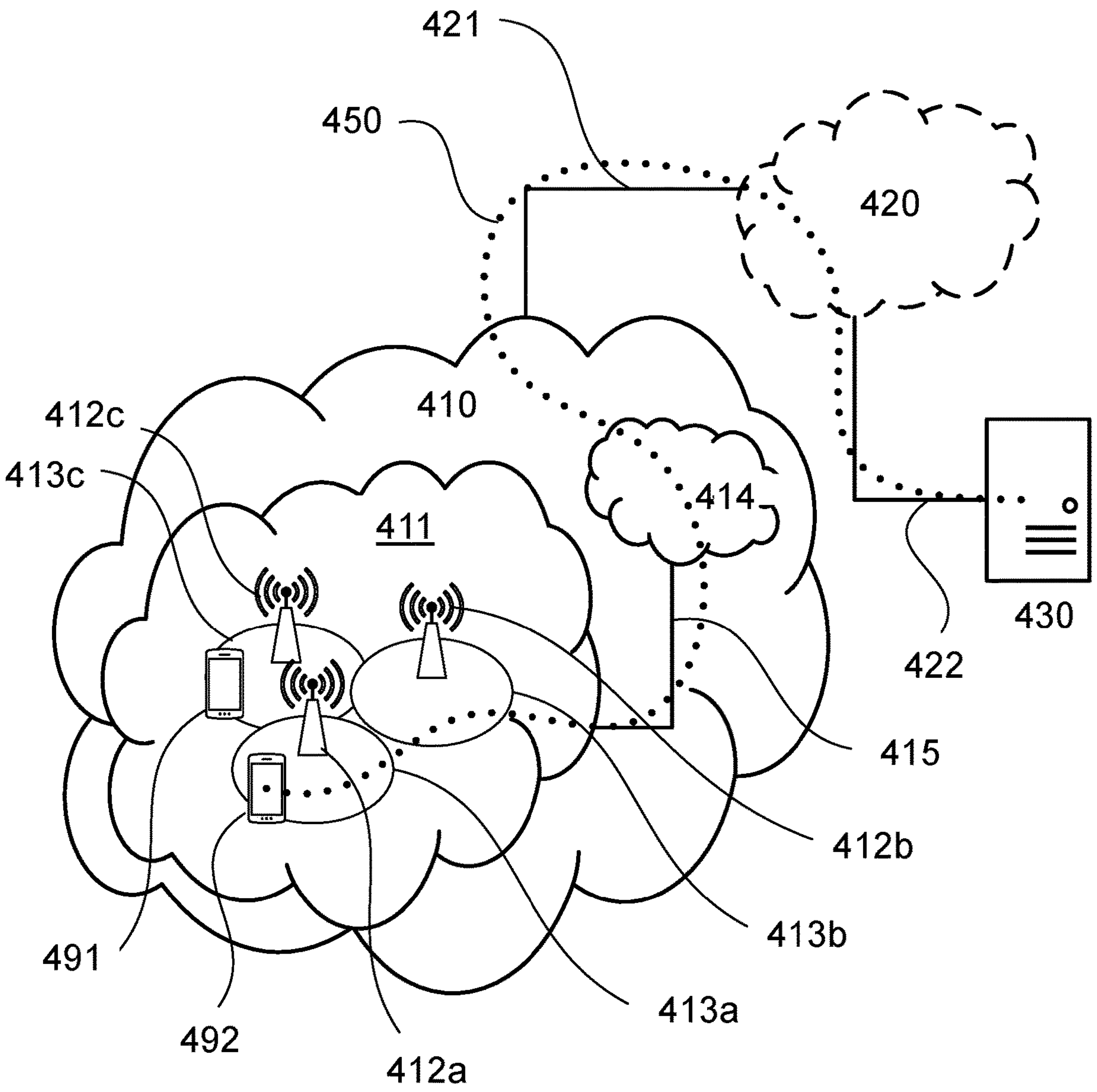
FIG. 7 illustrates a telecommunication network connected via an intermediate network to a host computer, according to certain embodiments.

FIG. 7 illustrates a telecommunication network connected via an intermediate network to a host computer in accordance with some embodiments.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 8:
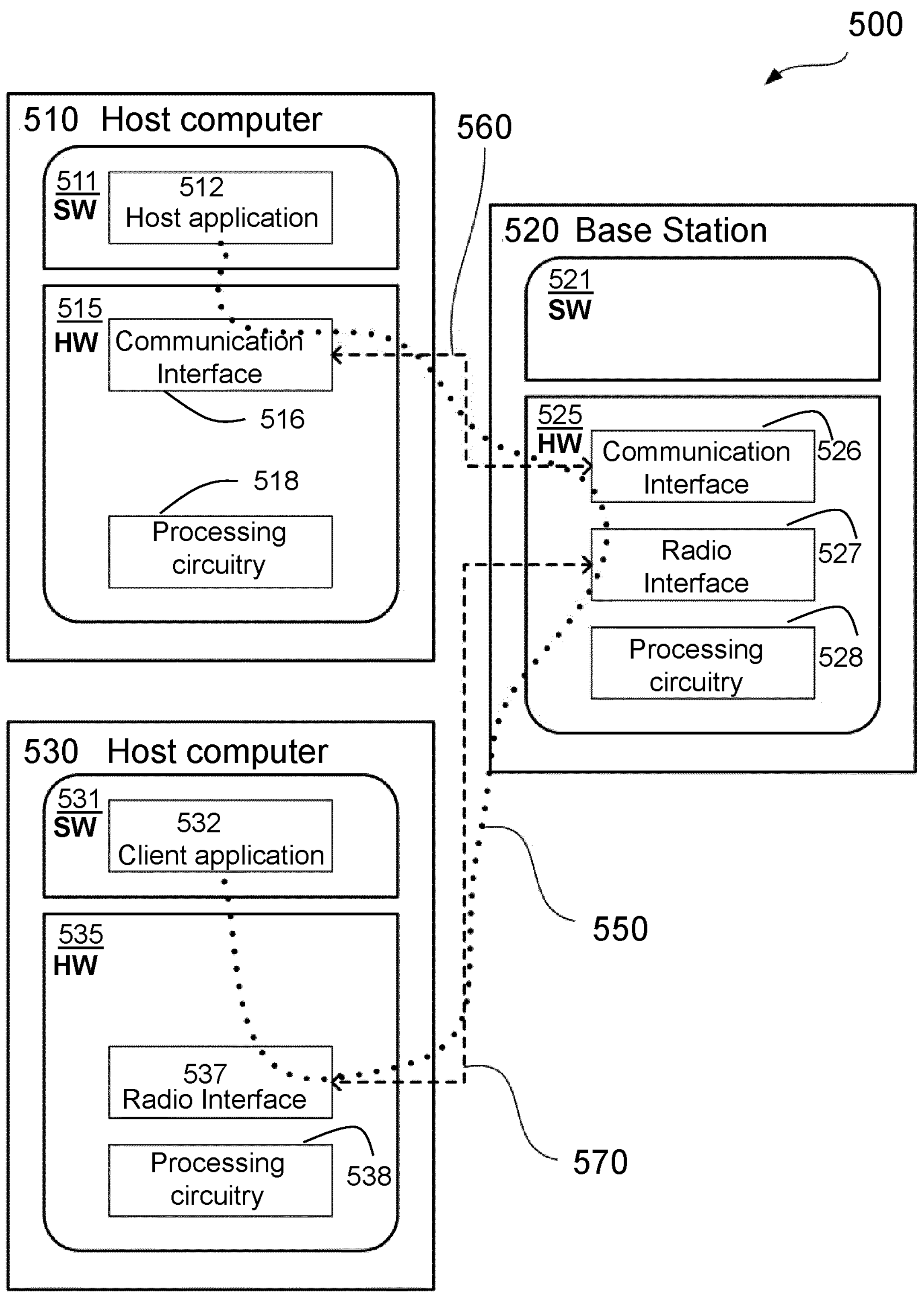
FIG. 8 illustrates a generalized block diagram of a host computer communicating via a base station with a user equipment over a partially wireless connection, according to certain embodiments.

FIG. 8 illustrates a host computer communicating via a base station with a user equipment over a partially wireless connection in accordance with some embodiments. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by base station 520. Communication interface 526 may be configured to facilitate connection 560 to host computer 510. Connection 560 may be direct or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 8 may be similar or identical to host computer 430, one of base stations 412*a*, 412*b*, 412*c* and one of UEs 491, 492 of FIG. 7, respectively. This is to say, the inner workings of these entities may be as shown in FIG. 8 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 9:
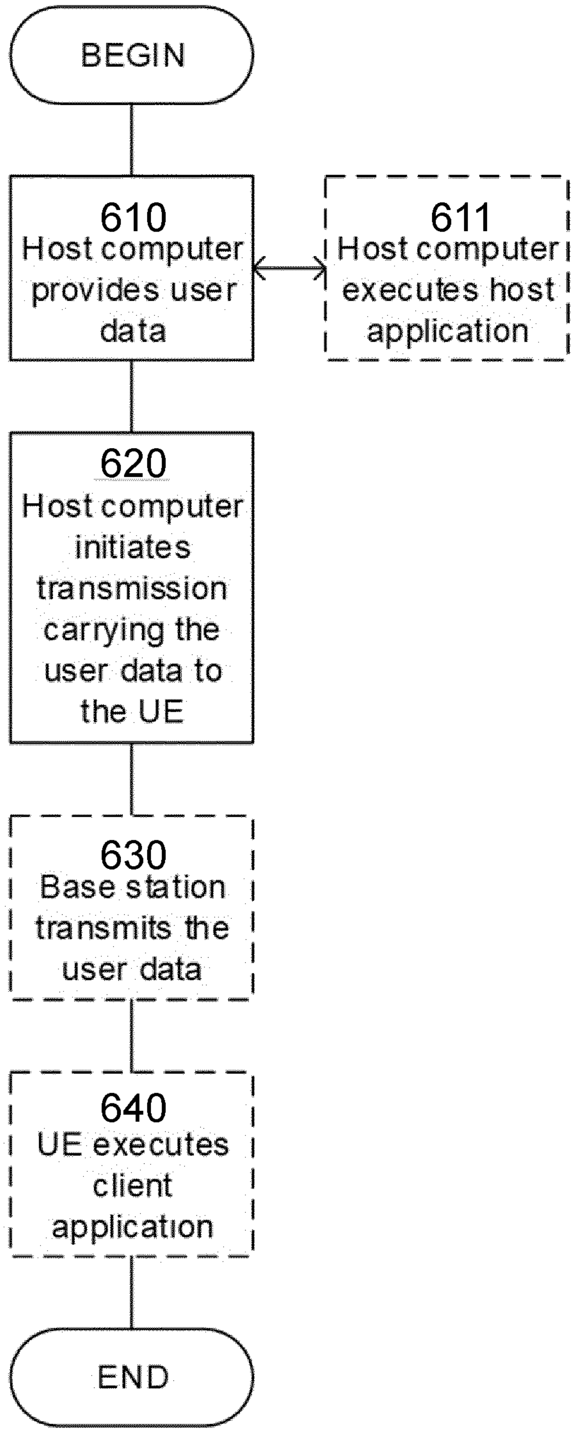
FIG. 9 illustrates a method implemented in a communication system, according to one embodiment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 10:
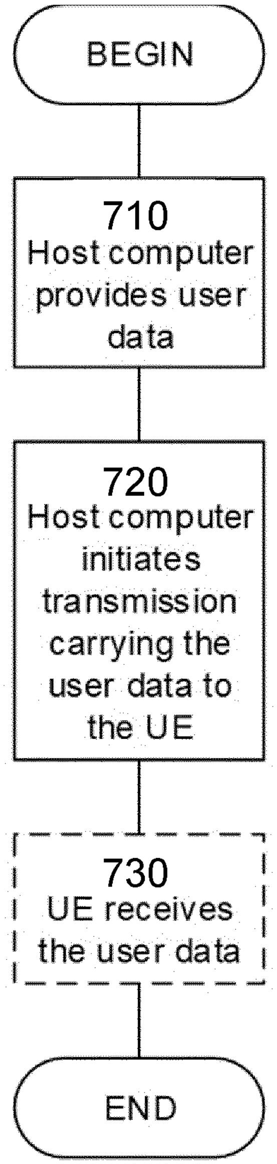
FIG. 10 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 11:
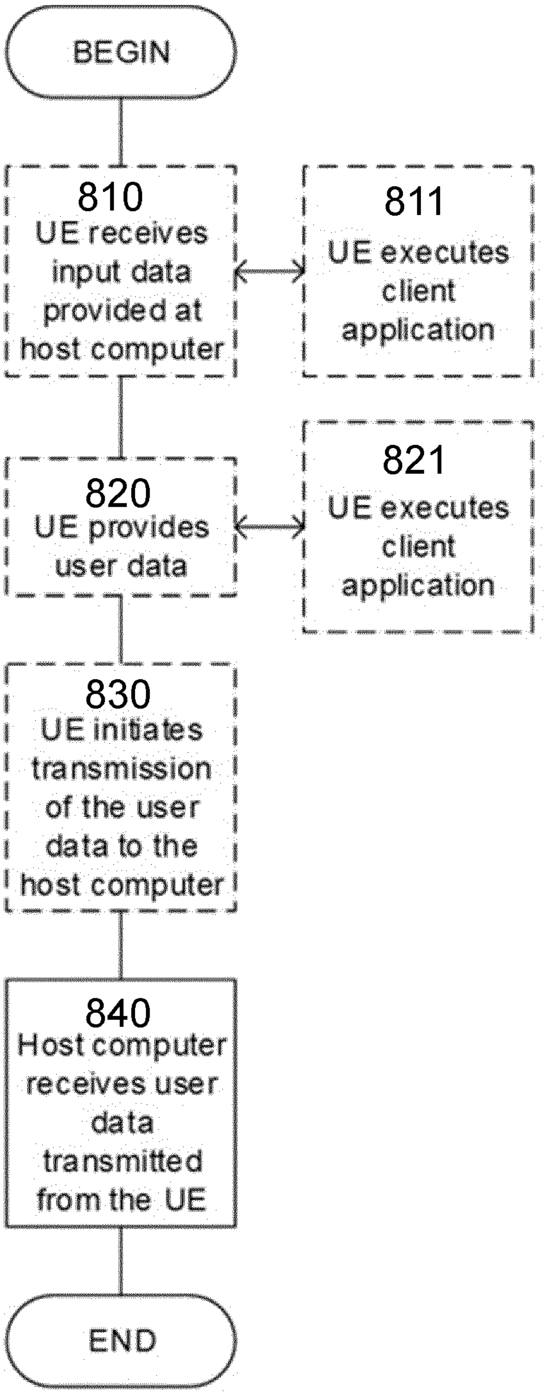
FIG. 11 illustrates another method implemented in a communication system, according to one embodiment.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 12:
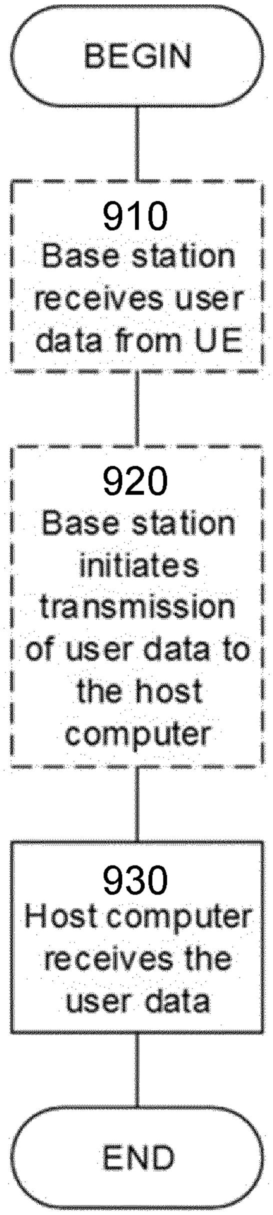
FIG. 12 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 13:
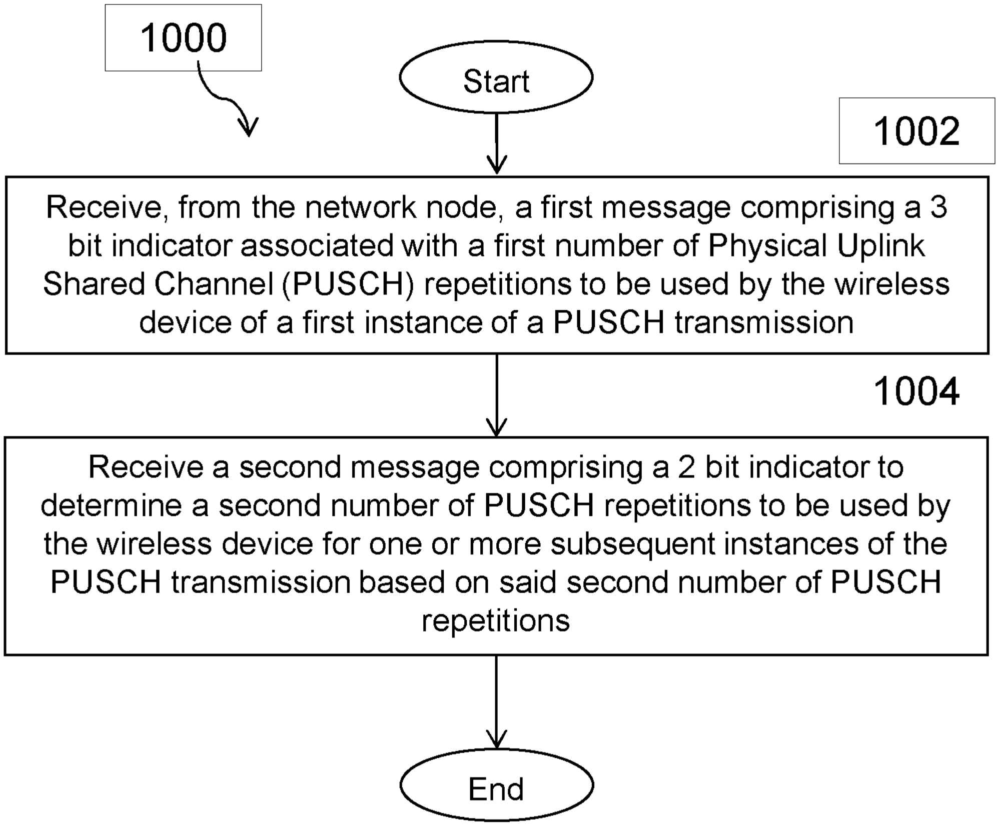
FIG. 13 illustrates an example method by a wireless device, according to certain embodiments.

FIG. 13 depicts a method 1000 by a wireless device 110, according to certain embodiments. At step 1002, the wireless device 110 receives, from the network node 160, a first message comprising a 3 bit indicator associated with a first number of PUSCH repetitions to be used by the wireless device 110 for a first instance of a PUSCH transmission. At step 1004, the wireless device 110 receives a second message comprising a 2 bit indicator to determine a second number of PUSCH repetitions to be used by the wireless device 110 for one or more subsequent instances of the PUSCH transmission based on said second number of PUSCH repetitions.

In a particular embodiment, the first message comprises a RRC message associated with an RRC configuration, and the wireless device 110 stores the 3 bit indicator associated with the RRC configuration. In a further particular embodiment, the wireless device 110 maps the 2 bit indicator associated with the second message to an updated 3 bit indicator based on said second number of PUSCH repetitions, updates the RRC configuration by replacing the 3 bit indicator associated with the first message with the updated 3 bit indicator, and stores the updated RRC configuration. In a further particular embodiment, the mapping step is performed by a physical layer and the updating and storing steps are performed by a higher layer.

In a particular embodiment, the wireless device 110 maps the 2 bit indicator to an updated 3 bit indicator and replaces the 3 bit indicator with the updated 3 bit indicator in a configuration. In a further particular embodiment, replacing the 3 bit indicator with the updated 3 bit indicator in the configuration includes transmitting, by a physical layer, the updated 3-bit indicator to a higher layer, receiving, by the higher layer, the updated 3-bit indicator and storing, by the higher layer, the updated 3 bit indicator in the configuration.

In a further particular embodiment, mapping the 2 bit indicator to the updated 3 bit indicator comprises applying, for example, a zero-bit padding to the 2 bit indicator to obtain the updated 3 bit indicator. In a further particular embodiment, applying the zero-bit padding comprises adding a 0 bit in front or at the end of the 2 bit indicator. In a further particular embodiment, applying the zero-bit padding comprises setting a most significant bit to zero. In a further particular embodiment, applying the zero-bit padding comprises setting a least significant bit to zero.

In a particular embodiment, for at least one of a PUSCH repetition adjustment field and a repetition number field in the second message, the wireless device 110 maps the 2 bit indicator to the updated 3 bit indicator comprises obtaining a new PUSCH repetition levels Table when the CRC of the DCI is scrambled by a PUR C-RNTI, the new PUSCH repetitions levels Table comprising:

| Higher layer parameter 'pusch-maxNumRepetitionCEmodeA' | {n1, n2, n3, n4, n5, n6, n7, n8} |
|---|---|
| Not configured | {1, 2, 4, 8, reserved, reserved, reserved, reserved} |
| 16 | {1, 4, 8, 16, reserved, reserved, reserved, reserved} |
| 32 | {1, 4, 16, 32, reserved, reserved, reserved, reserved} |

In a particular embodiment, the second message comprises a DCI message using Format 6-0A or Format 6-0B. In a further particular embodiment, the DCI message comprises an acknowledgement message or a fallback indicator message.

In a particular embodiment, the first message is received via L2/L3 signaling and the second message is received via L1 signaling.

In a particular embodiment, prior to receiving the second message from the network node 160 that comprises the 3 bit indicator, the wireless device 110 transmits the first instance of a PUSCH transmission based on the first number of PUSCH repetitions, and wherein the second message comprising the 3 bit indicator is a response message.

In a particular embodiment, the 3 bit indicator in the second message is comprised by the following set of values {1, 2, 4, 8, 12, 16, 24, 32} to determine the number of repetitions in one or more subsequent instances of PUSCH transmissions on PUR.

In a particular embodiment, the 3 bit indicator in the second message is selected from a set of values comprising {1, 2, 4, 8, 12, 16, 24, 32}, and the wireless device 110 uses the 3 bit indicator to determine the number of repetitions in one or more subsequent instances of PUSCH transmissions.

In a particular embodiment, a ce-pdsch-puschEnhancement-config is not configured by the first message and at least one of a PUSCH repetition adjustment field and a repetition number field in the second message comprises a 3 bit indicator when the CRC of the DCI is scrambled by a PUR C-RNTI.

In a particular embodiment, a ce-pdsch-puschEnhancement-config is configured by the first message and at least one of a PUSCH repetition adjustment field and a repetition number field in the second message comprises a 3 bit indicator when the CRC of the DCI is scrambled by a PUR C-RNTI.

In a particular embodiment, a set of values based on the first number of repetitions is defined, and the set of values comprises at least a first value associated with the first number of repetitions. The wireless device 110 selects a second value associated with the second number of repetitions from the set of values. In a further particular embodiment, the second value associated with the second number of repetitions is larger than the first value associated with the first number of repetitions. In a further particular embodiment, the second value associated with the second number of repetitions is smaller than the first value associated with the first number of repetitions.

In a particular embodiment, the wireless device 110 transmits the one or more subsequent instances on the PUSCH based on said second number of PUSCH repetitions.

In a particular embodiment, the first instance of the PUSCH transmission and the subsequent instances on the PUSCH transmission comprises periodic PUSCH transmissions. In a particular embodiment, the periodic PUSCH transmissions are on PURs.

Figure 14:
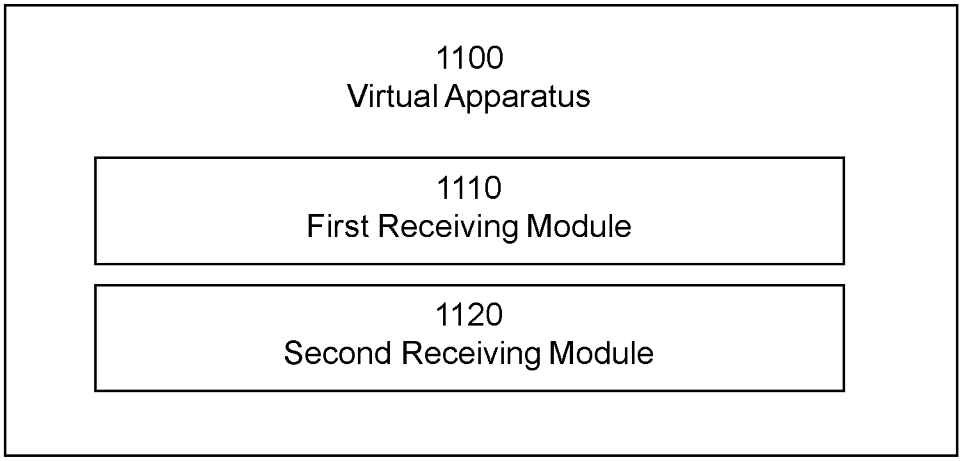
FIG. 14 illustrates an example virtual apparatus, according to certain embodiments.

FIG. 14 illustrates a schematic block diagram of a virtual apparatus 1100 in a wireless network (for example, the wireless network shown in FIG. 2). The apparatus may be implemented in a wireless device or network node (e.g., wireless device 110 or network node 160 shown in FIG. 2). Apparatus 1100 is operable to carry out the example method described with reference to FIG. 13 and possibly any other processes or methods disclosed herein. It is also to be understood that the method of FIG. 13 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 1110, second receiving module 1120, and any other suitable units of apparatus 1100 to perform corresponding functions according one or more embodiments of the present disclosure.

According to certain embodiments, first receiving module 1110 may perform certain of the receiving functions of the apparatus 1100. For example, first receiving module 1110 may receive, from the network node, a first message comprising a 3 bit indicator associated with a first number of PUSCH repetitions to be used by the wireless device for a first instance of a PUSCH transmission.

According to certain embodiments, second receiving module 1120 may perform certain other of the receiving functions of the apparatus 1100. For example, second receiving module 1120 may receive a second message comprising a 2 bit indicator to determine a second number of PUSCH repetitions to be used by the wireless device for one or more subsequent instances of the PUSCH transmission based on said second number of PUSCH repetitions.

As used herein, the term module may have conventional meaning in the field of electronics, electrical devices and/or electronic devices and may include, for example, electrical and/or electronic circuitry, devices, units, processors, memories, logic solid state and/or discrete devices, computer programs or instructions for carrying out respective tasks, procedures, computations, outputs, and/or displaying functions, and so on, as such as those that are described herein.

Figure 15:
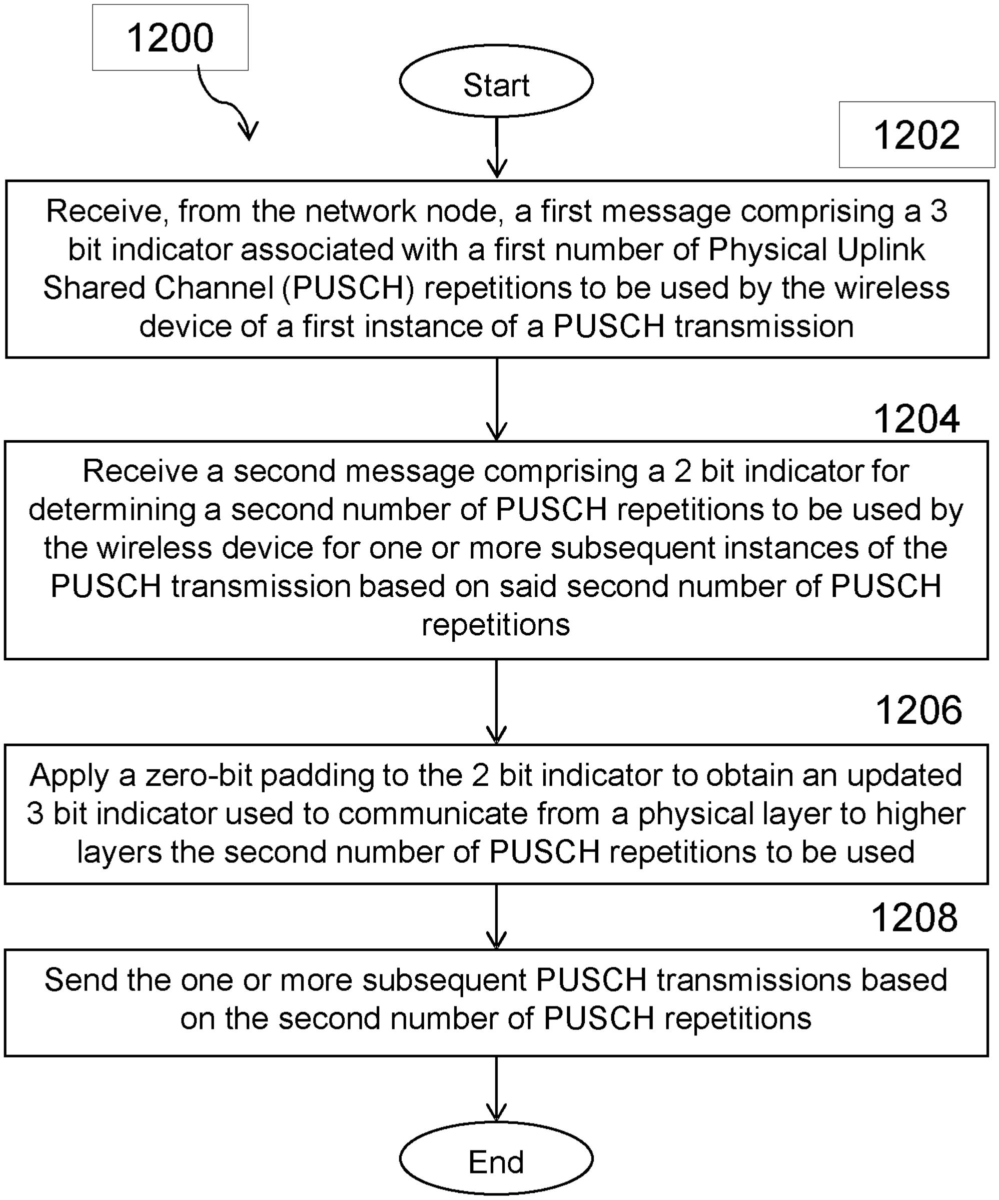
FIG. 15 illustrates another example method by a wireless device, according to certain embodiments.

FIG. 15 illustrates a method 1200 performed by a wireless device 110, according to certain embodiments. At step 1202, the wireless device 110 receives, from the network node 160, a first message comprising a 3 bit indicator associated with a first number of PUSCH repetitions to be used by the wireless device 110 for a first instance of a PUSCH transmission. At step 1204, the wireless device 110 receives a second message comprising a 2 bit indicator for determining a second number of PUSCH repetitions to be used by the wireless device 110 for one or more subsequent instances of the PUSCH transmission based on said second number of PUSCH repetitions. At step 1206, the wireless device 110 applies a zero-bit padding to the 2 bit indicator to obtain an updated 3 bit indicator used to communicate from physical layer to higher layers the second number of PUSCH repetitions to be used. At step 1208, the wireless device 110 sends the one or more subsequent PUSCH transmissions based on the second number of PUSCH repetitions.

In a particular embodiment, the first message comprises a radio resource control, RRC, message associated with an RRC configuration, and the wireless device stores the 3 bit indicator associated with the RRC configuration.

In a particular embodiment, the wireless device 110 updates the RRC configuration by replacing the 3 bit indicator associated with the first message with the updated 3 bit indicator. The wireless device 110 stores the updated RRC configuration.

In a particular embodiment, the step of applying the zero-bit padding is performed by a physical layer and the updating and storing steps are performed by a higher layer.

In a particular embodiment, the wireless device 110 replaces the 3 bit indicator stored in the higher layer configuration with the updated 3 bit indicator resulting from applying the zero-bit padding in the physical layer.

In a further particular embodiment, when replacing the 3 bit indicator stored in the higher layer configuration with the updated 3 bit indicator resulting from applying the zero-bit padding in the physical layer, the wireless device 110 applies a zero-bit padding at the physical layer to obtain an updated 3 bit indicator to communicate to higher layers the second number of PUSCH repetitions to be used. The higher layer receive the updated 3 bit indicator and store the updated 3 bit indicator in the configuration.

In a particular embodiment, when applying the zero-bit padding, the wireless device 110 adds a 0 bit in front of the 2 bit indicator associated to the second message.

In a further particular embodiment, when applying the zero-bit padding, the wireless device 110 sets a most significant bit to zero.

In a particular embodiment, the second message comprises a DCI message.

In a further particular embodiment, the DCI message comprises an acknowledgement message or a fallback indicator message.

In a particular embodiment, the first message is received via Layer 2/Layer 3, L2/L3, signaling and the second message is received via Layer 1, L1, signaling.

In a particular embodiment, the 2 bit indicator in the second message is comprised by the following sets of values {1, 2, 4, 8}, or {1, 4, 8, 16}, or {1, 4, 16, 32} to determine the number of repetitions in one or more subsequent instances of PUSCH transmissions on at least one PUR.

In a particular embodiment, a set of values based on the first number of repetitions is defined. The set of values comprises at least a first value associated with the first number of repetitions, and the wireless device 110 selects a second value associated with the second number of repetitions from the set of values.

In a particular embodiment, the first number of repetitions or the second number of repetitions is one of 1, 2, 4, 8, 12, 16, 24, and 32.

In a further particular embodiment, the second value associated with the second number of repetitions is larger than the first value associated with the first number of repetitions.

In a particular embodiment, the second value associated with the second number of repetitions is smaller than the first value associated with the first number of repetitions.

In a particular embodiment, the first instance of the PUSCH transmission and the subsequent instances on the PUSCH transmission comprises periodic PUSCH transmissions, and the periodic PUSCH transmissions are on PURs.

Figure 16:
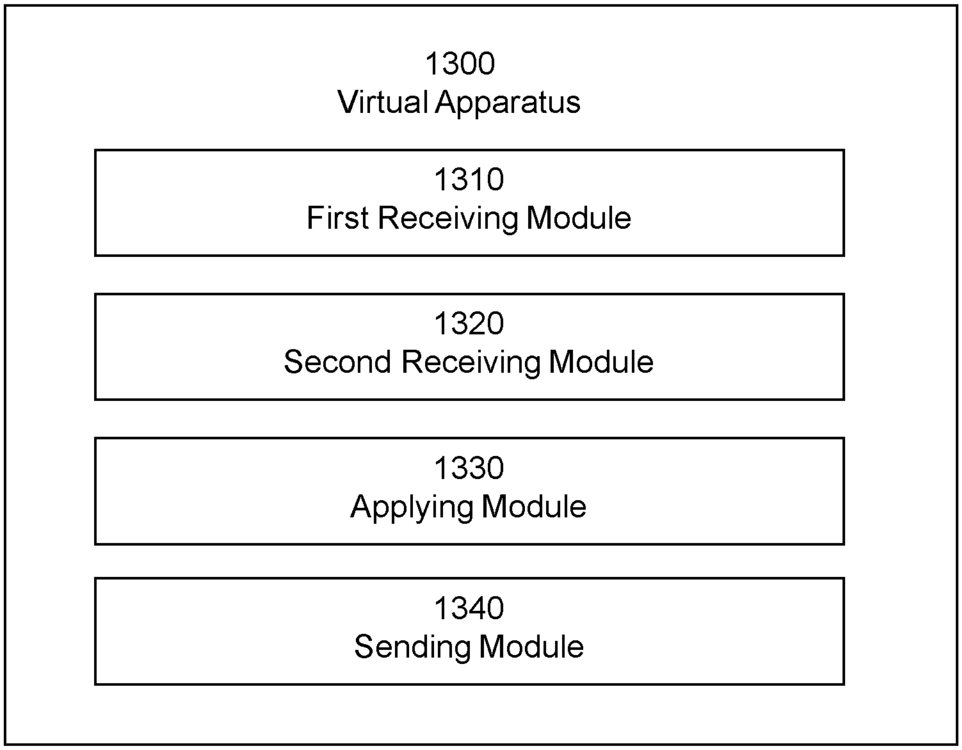
FIG. 16 illustrates another example virtual apparatus, according to certain embodiments.

FIG. 16 illustrates a schematic block diagram of a virtual apparatus 1300 in a wireless network (for example, the wireless network shown in FIG. 2). The apparatus may be implemented in a wireless device or network node (e.g., wireless device 110 or network node 160 shown in FIG. 2). Apparatus 1300 is operable to carry out the example method described with reference to FIG. 15 and possibly any other processes or methods disclosed herein. It is also to be understood that the method of FIG. 15 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 1310, second receiving module 1320, applying module 1330, sending module 1340, and any other suitable units of apparatus 1300 to perform corresponding functions according one or more embodiments of the present disclosure.

According to certain embodiments, first receiving module 1310 may perform certain of the receiving functions of the apparatus 1300. For example, first receiving module 1310 may receive, from the network node 160, a first message comprising a 3 bit indicator associated with a first number of PUSCH repetitions to be used by the wireless device 110 for a first instance of a PUSCH transmission.

According to certain embodiments, second receiving module 1320 may perform certain other of the receiving functions of the apparatus 1300. For example, second receiving module 1320 may receive a second message comprising a 2 bit indicator for determining a second number of PUSCH repetitions to be used by the wireless device 110 for one or more subsequent instances of the PUSCH transmission based on said second number of PUSCH repetitions.

According to certain embodiments, applying module 1330 may perform certain of the applying functions of the apparatus 1300. For example, applying module 1330 may apply a zero-bit padding to the 2 bit indicator to obtain an updated 3 bit indicator used to communicate from physical layer to higher layers the second number of PUSCH repetitions to be used.

According to certain embodiments, sending module 1340 may perform certain of the sending functions of the apparatus 1300. For example, sending module 1340 may send the one or more subsequent PUSCH transmissions based on the second number of PUSCH repetitions.

Figure 17:
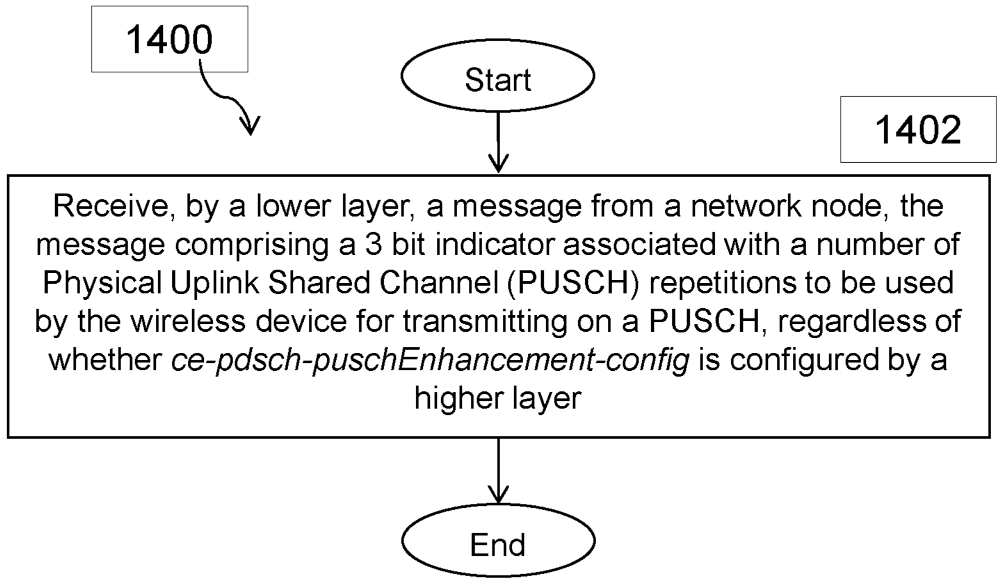
FIG. 17 illustrates another example method by a wireless device, according to certain embodiments.

FIG. 17 depicts another method 1400 by a wireless device 110, according to certain embodiments. At step 1402, the wireless device 110 receives, by a lower layer, a message from the network node. The message includes a 3 bit indicator associated with a number of PUSCH repetitions to be used by the wireless device 110 for transmitting on a PUSCH, regardless of whether ce-pdsch-puschEnhancement-config is configured by a higher layer.

In a particular embodiment, the message received by the lower layer comprises a RRC message received via L2/L3 signaling. In a further particular embodiment, the message includes a DCI message received via L1 signaling. In still a further particular embodiment, the DCI message comprises an acknowledgement message or a fallback indicator message.

In a particular embodiment, the wireless device 110 transmits the 3-bit indicator to the higher layer for updating of a RRC configuration to include the 3 bit indicator. In a further particular embodiment, the wireless device 110 stores, by the higher layer, the 3-bit indicator with the RRC configuration.

In a particular embodiment, the wireless device 110 transmits on the PUSCH based on the number of PUSCH repetitions. In a further particular embodiment, transmitting on the PUSCH comprises transmitting a plurality of periodic PUSCH transmissions on the PUSCH. In a further particular embodiment, the periodic PUSCH transmissions are on preconfigured uplink resources (PUR).

Figure 18:
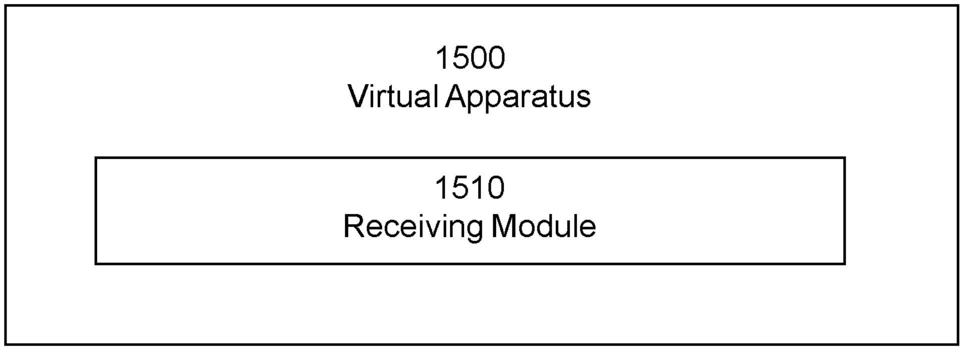
FIG. 18 illustrates another example virtual apparatus, according to certain embodiments.

FIG. 18 illustrates a schematic block diagram of another virtual apparatus 1500 in a wireless network (for example, the wireless network shown in FIG. 2). The apparatus may be implemented in a wireless device or network node (e.g., wireless device 110 or network node 160 shown in FIG. 2). Apparatus 1500 is operable to carry out the example method described with reference to FIG. 17 and possibly any other processes or methods disclosed herein. It is also to be understood that the method of FIG. 17 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1510 and any other suitable units of apparatus 1500 to perform corresponding functions according one or more embodiments of the present disclosure.

According to certain embodiments, receiving module 1510 may perform certain of the receiving functions of the apparatus 1500. For example, receiving module 1510 may receive, by a lower layer, a message from the network node. The message includes a 3 bit indicator associated with a number of PUSCH repetitions to be used by the wireless device 110 for transmitting on a PUSCH, regardless of whether ce-pdsch-puschEnhancement-config is configured by a higher layer.

Figure 19:
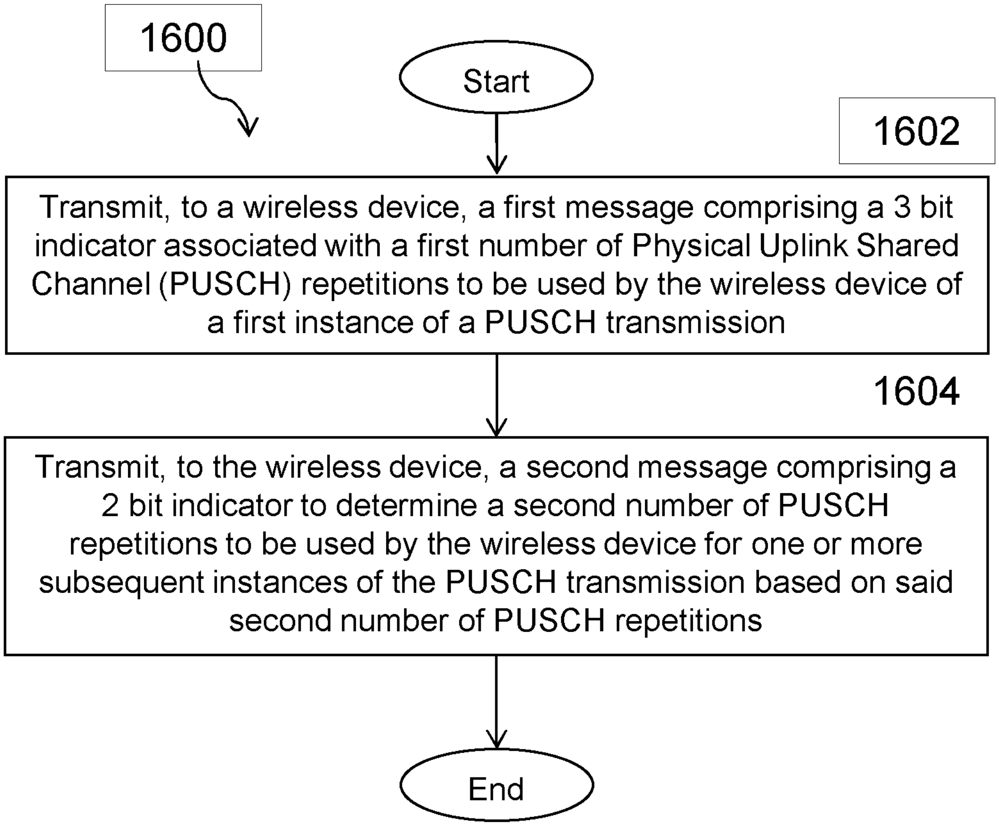
FIG. 19 illustrates an example method by a network node, according to certain embodiments.

FIG. 19 depicts a method 1600 by a network node 160, according to certain embodiments. At step 1602, the network node 160 transmits, to a wireless device 110, a first message comprising a 3 bit indicator associated with a first number of PUSCH repetitions to be used by the wireless device 110 for a first instance of a PUSCH transmission. At step 1604, the network node transmits, to the wireless device, a second message comprising a 2 bit indicator to determine a second number of PUSCH repetitions to be used by the wireless device 110 for one or more subsequent instances of the PUSCH transmission based on said second number of PUSCH repetitions.

In a particular embodiment, the first message comprises a RRC message associated with an RRC configuration, and the network node 160 stores the 3 bit indicator associated with the RRC configuration. In a further particular embodiment, the network node 160 maps the 2 bit indicator associated with the second message to an updated 3 bit indicator based on said second number of PUSCH repetitions, updates the RRC configuration by replacing the 3 bit indicator associated with the first message with the updated 3 bit indicator, and stores the updated RRC configuration.

In a particular embodiment, the network node 160 configures the wireless device 110 to map the 2 bit indicator associated with the second message to an updated 3 bit indicator based on said second number of PUSCH repetitions, update the RRC configuration by replacing the 3 bit indicator associated with the first message with the updated 3 bit indicator, and store the updated RRC configuration.

In a particular embodiment, the mapping step is performed by a physical layer and the updating and storing steps are performed by a higher layer.

In a particular embodiment, the network node 160 maps the 2 bit indicator to an updated 3 bit indicator and replaces the 3 bit indicator with the updated 3 bit indicator in a configuration.

In a particular embodiment, the network node 160 configures the wireless device 110 to map the 2 bit indicator to an updated 3 bit indicator and replaces the 3 bit indicator with the updated 3 bit indicator in a configuration.

In a particular embodiment, replacing the 3 bit indicator with the updated 3 bit indicator in the configuration comprises transmitting, by a physical layer, the updated 3-bit indicator to a higher layer, receiving, by the higher layer, the updated 3-bit indicator, and storing, by the higher layer, the updated 3 bit indicator in the configuration.

In a particular embodiment, mapping the 2 bit indicator to the updated 3 bit indicator comprises applying, for example, a zero-bit padding to the 2 bit indicator to obtain the updated 3 bit indicator. In a further particular embodiment, applying the zero-bit padding comprises adding a 0 bit in front or at the end of the 2 bit indicator. In a further particular embodiment, applying the zero-bit padding comprises setting a most significant bit to zero. In a further particular embodiment, applying the zero-bit padding comprises setting a least significant bit to zero.

In a particular embodiment, for at least one of a PUSCH repetition adjustment field and a Repetition number field in the second message, the network node 160 maps the 2 bit indicator to the updated 3 bit indicator comprises obtaining a new PUSCH repetition levels Table when the CRC of the DCI is scrambled by a PUR C-RNTI, the new PUSCH repetitions levels Table comprising:

| Higher layer parameter 'pusch-maxNumRepetitionCEmodeA' | {n1, n2, n3, n4, n5, n6, n7, n8} |
|---|---|
| Not configured | {1, 2, 4, 8, reserved, reserved, reserved, reserved} |
| 16 | {1, 4, 8, 16, reserved, reserved, reserved, reserved} |
| 32 | {1, 4, 16, 32, reserved, reserved, reserved, reserved} |

In a particular embodiment, the second message comprises a DCI message using Format 6-0A or Format 6-0B.

In a particular embodiment, the DCI message comprises an acknowledgement message or a fallback indicator message.

In a particular embodiment, the first message is received via L2/L3 signaling and the second message is received via L1 signaling.

In a particular embodiment, prior to receiving the second message from the network node 160 that comprises the 3 bit indicator, the network node 160 transmits the first instance of a PUSCH transmission based on the first number of PUSCH repetitions, and wherein the second message comprising the 3 bit indicator is a response message.

In a particular embodiment, the 3 bit indicator in the second message is comprised by the following set of values {1, 2, 4, 8, 12, 16, 24, 32} to determine the number of repetitions in one or more subsequent instances of PUSCH transmissions on PUR.

In a particular embodiment, the 3 bit indicator in the second message is selected from a set of values comprising {1, 2, 4, 8, 12, 16, 24, 32}, and the network node 160 uses the 3 bit indicator to determine the number of repetitions in one or more subsequent instances of PUSCH transmissions.

In a particular embodiment, a ce-pdsch-puschEnhancement-config is not configured by the first message, and at least one of a PUSCH repetition adjustment field and a repetition number field in the second message comprises a 3 bit indicator when the CRC of the DCI is scrambled by a PUR C-RNTI.

In a particular embodiment, a ce-pdsch-puschEnhancement-config is configured by the first message, and at least one of a PUSCH repetition adjustment field and a repetition number field in the second message comprises a 3 bit indicator when the CRC of the DCI is scrambled by a PUR C-RNTI.

In a particular embodiment, a set of values based on the first number of repetitions is defined, and the set of values comprises at least a first value associated with the first number of repetitions, and the method further comprises selecting a second value associated with the second number of repetitions from the set of values. In a further particular embodiment, the second value associated with the second number of repetitions is larger than the first value associated with the first number of repetitions. In a further particular embodiment, the second value associated with the second number of repetitions is smaller than the first value associated with the first number of repetitions.

In a particular embodiment, the network node 160 receives the one or more subsequent instances on the PUSCH based on said second number of PUSCH repetitions.

In a particular embodiment, the first instance of the PUSCH transmission and the subsequent instances on the PUSCH transmission comprises periodic PUSCH transmissions. In a further particular embodiment, the periodic PUSCH transmissions are on PUR.

Figure 20:
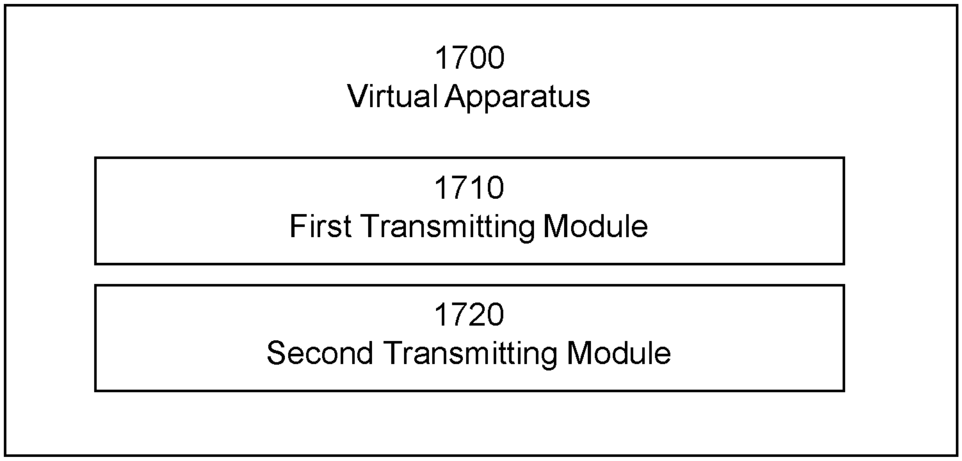
FIG. 20 illustrates another example virtual apparatus, according to certain embodiments.

FIG. 20 illustrates a schematic block diagram of another virtual apparatus 1700 in a wireless network (for example, the wireless network shown in FIG. 2). The apparatus may be implemented in a wireless device or network node (e.g., wireless device 110 or network node 160 shown in FIG. 2). Apparatus 1700 is operable to carry out the example method described with reference to FIG. 19 and possibly any other processes or methods disclosed herein. It is also to be understood that the method of FIG. 19 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting module 1710, second transmitting module 1720, and any other suitable units of apparatus 1700 to perform corresponding functions according one or more embodiments of the present disclosure.

According to certain embodiments, first transmitting module 1710 may perform certain of the transmitting functions of the apparatus 1700. For example, transmitting module 1710 may transmit, to a wireless device 110, a first message comprising a 3 bit indicator associated with a first number of PUSCH repetitions to be used by the wireless device for a first instance of a PUSCH transmission.

According to certain embodiments, second transmitting module 1720 may perform certain of the transmitting functions of the apparatus 1700. For example, second transmitting module 1720 may transmit, to the wireless device 110, a second message comprising a 2 bit indicator to determine a second number of PUSCH repetitions to be used by the wireless device 110 for one or more subsequent instances of the PUSCH transmission based on said second number of PUSCH repetitions.

Figure 21:
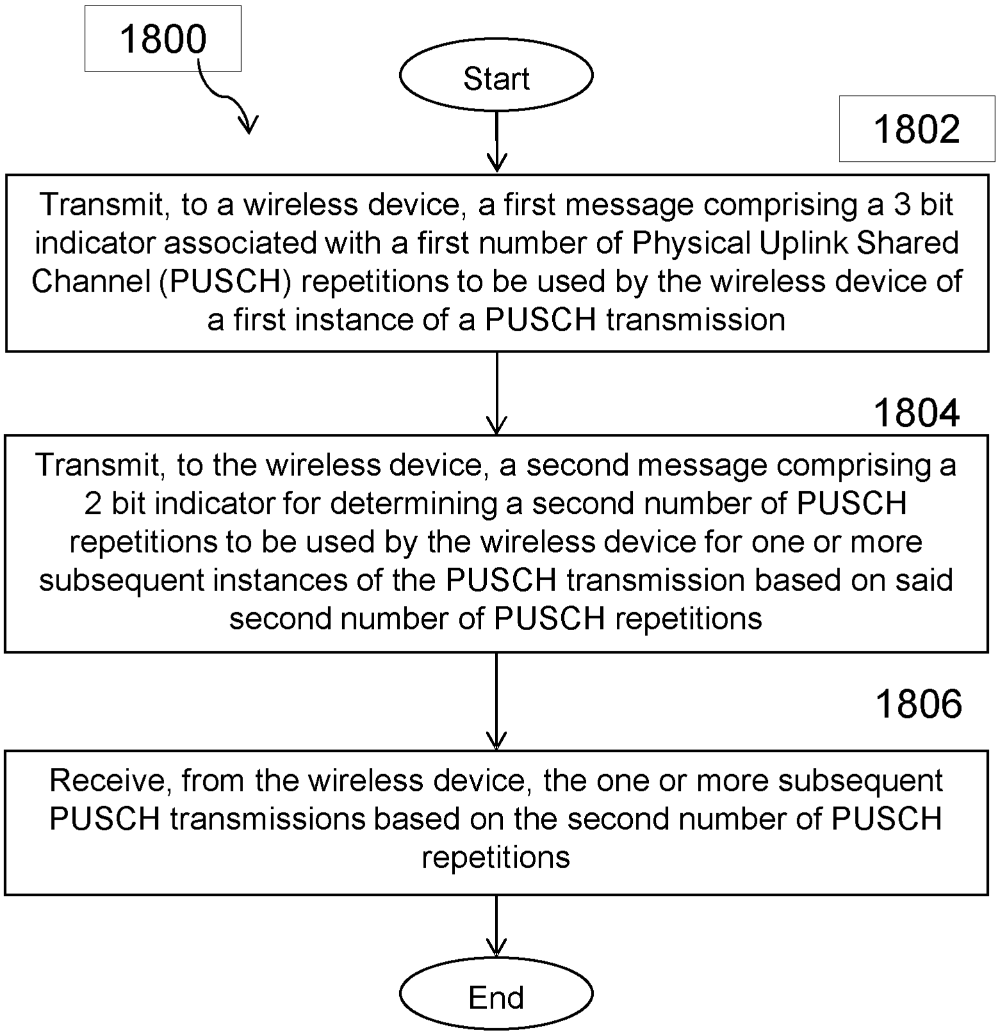
FIG. 21 illustrates another example method by a network node, according to certain embodiments.

FIG. 21 illustrates another method 1800 performed by a network node 160, according to certain embodiments. At step 1802, the network node 160 transmits, to a wireless device 110, a first message comprising a 3 bit indicator associated with a first number of PUSCH repetitions to be used by the wireless device for a first instance of a PUSCH transmission. At step 1804, the network node 160 transmits, to the wireless device 110, a second message comprising a 2 bit indicator for determining a second number of PUSCH repetitions to be used by the wireless device for one or more subsequent instances of the PUSCH transmission based on said second number of PUSCH repetitions. At step 1806, the network node 160 receives, from the wireless device 110, the one or more subsequent PUSCH transmissions based on the second number of PUSCH repetitions.

In a particular embodiment, the first message comprises a RRC message associated with an RRC configuration, and the network node 160 stores the 3 bit indicator associated with the RRC configuration.

In a particular embodiment, the network node 160 updates the RRC configuration by replacing the 3 bit indicator associated with the first message with the updated number of repetitions to be used for the second message and stores the updated RRC configuration.

In a particular embodiment, the network node 160 replaces, in a configuration, the 3 bit indicator with the updated 3 bit indicator resulting from applying the zero-bit padding.

In a particular embodiment, the second message comprises a DCI message.

In a further particular embodiment, the DCI message comprises an acknowledgement message or a fallback indicator message.

In a particular embodiment, the first message is transmitted via Layer 2/Layer 3, L2/L3, signaling and the second message is transmitted via Layer 1, L1, signaling.

In a particular embodiment, the 2 bit indicator in the second message is comprised by the following sets of values {1, 2, 4, 8}, or {1, 4, 8, 16}, or {1, 4, 16, 32} to determine the number of repetitions in one or more subsequent instances of PUSCH transmissions on at least one PUR.

In a particular embodiment, a set of values based on the first number of repetitions is defined. The set of values comprises at least a first value associated with the first number of repetitions, and the network node 160 selects a second value associated with the second number of repetitions from the set of values.

In a particular embodiment, the first number of repetitions or the second number of repetitions is one of 1, 2, 4, 8, 12, 16, 24, and 32.

In a further particular embodiment, the second value associated with the second number of repetitions is larger than the first value associated with the first number of repetitions.

In a further particular embodiment, the second value associated with the second number of repetitions is smaller than the first value associated with the first number of repetitions.

In a particular embodiment, the first instance of the PUSCH transmission and the subsequent instances on the PUSCH transmission comprises periodic PUSCH transmissions, and wherein the periodic PUSCH transmissions are on PURs.

In a particular embodiment, the network node 160 replaces, in a configuration, the 3 bit indicator with the updated 3 bit indicator resulting from applying the zero-bit padding.

Figure 22:
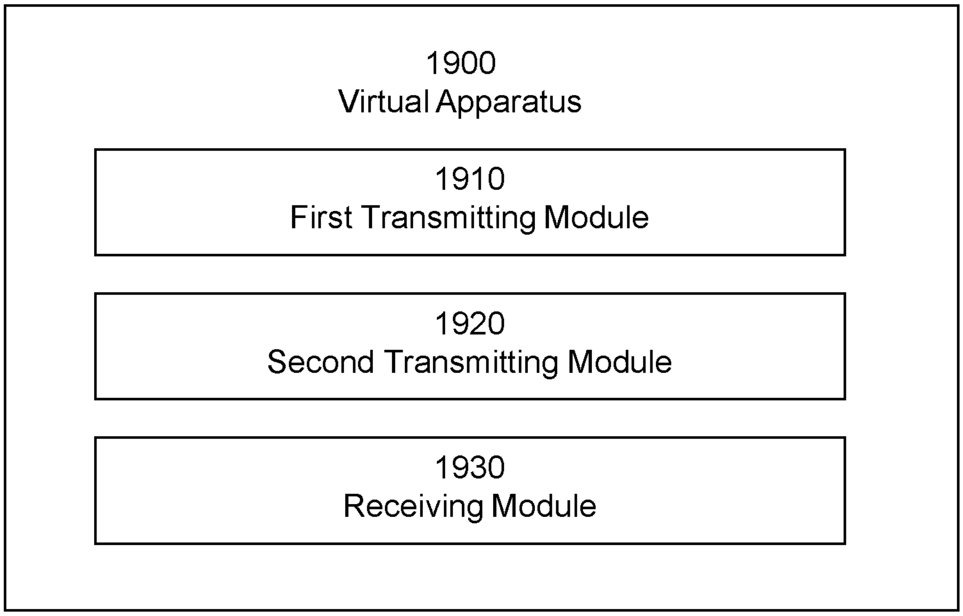
FIG. 22 illustrates another example virtual apparatus, according to certain embodiments.

FIG. 22 illustrates a schematic block diagram of another virtual apparatus 1900 in a wireless network (for example, the wireless network shown in FIG. 2). The apparatus may be implemented in a wireless device or network node (e.g., wireless device 110 or network node 160 shown in FIG. 2). Apparatus 1900 is operable to carry out the example method described with reference to FIG. 21 and possibly any other processes or methods disclosed herein. It is also to be understood that the method of FIG. 21 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting module 1910, second transmitting module 1920, receiving module 1930, and any other suitable units of apparatus 1900 to perform corresponding functions according one or more embodiments of the present disclosure.

According to certain embodiments, first transmitting module 1910 may perform certain of the transmitting functions of the apparatus 1900. For example, transmitting module 1910 may transmit, to a wireless device 110, a first message comprising a 3 bit indicator associated with a first number of PUSCH repetitions to be used by the wireless device for a first instance of a PUSCH transmission.

According to certain embodiments, second transmitting module 1920 may perform certain other of the transmitting functions of the apparatus 1900. For example, second transmitting module 1920 may transmit, to the wireless device 110, a second message comprising a 2 bit indicator for determining a second number of PUSCH repetitions to be used by the wireless device for one or more subsequent instances of the PUSCH transmission based on said second number of PUSCH repetitions.

According to certain embodiments, receiving module 1930 may perform certain of the receiving functions of the apparatus 1900. For example, receiving module 1340 may receive, from the wireless device 110, the one or more subsequent PUSCH transmissions based on the second number of PUSCH repetitions.

Figure 23:
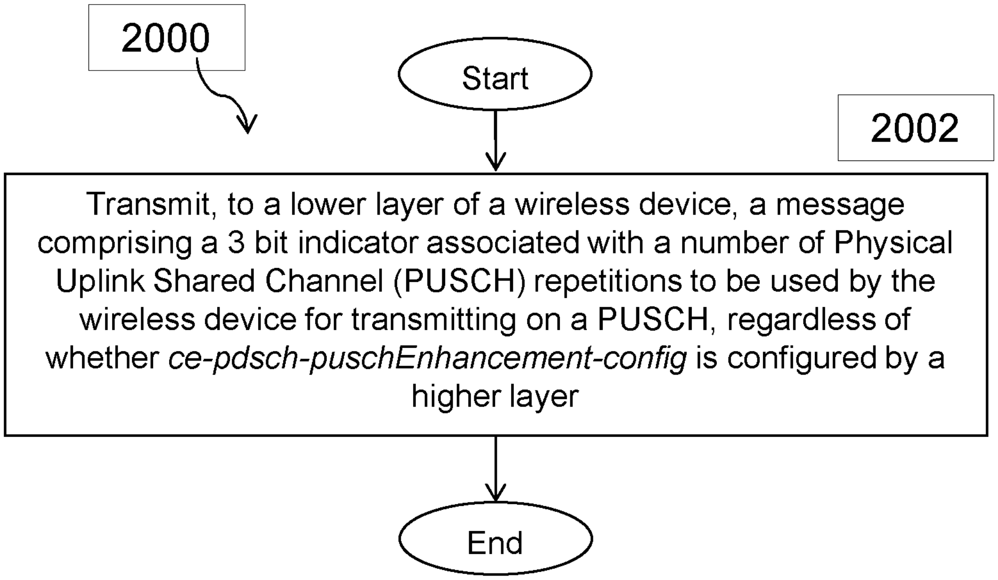
FIG. 23 illustrates another example method by a network node, according to certain embodiments.

FIG. 23 depicts another method 2000 by a network node 160, according to certain embodiments. At step 2002, the network node 160 transmits, to a lower layer of a wireless device 110, a message comprising a 3 bit indicator associated with a number of PUSCH repetitions to be used by the wireless device 110 for transmitting on a PUSCH, regardless of whether ce-pdsch-puschEnhancement-config is configured by a higher layer.

In a particular embodiment, the message received by the lower layer comprises a RRC message received via L2/L3 signaling.

In a particular embodiment, the message comprises a DCI message received via L1 signaling. In a further particular embodiment, the DCI message comprises an acknowledgement message or a fallback indicator message.

In a particular embodiment, the network node 160 configures the wireless device 110 to transmit the 3-bit indicator to the higher layer for updating of a RRC configuration to include the 3 bit indicator. In a further particular embodiment, the network node 160 configures the wireless device 110 to store, by the higher layer, the 3-bit indicator with the RRC configuration.

In a particular embodiment, the network node 160 transmits the 3-bit indicator to the higher layer for updating of a RRC configuration to include the 3 bit indicator. In a further particular embodiment, the network node 160 stores, by the higher layer, the 3-bit indicator with the RRC configuration.

In a particular embodiment, the network node 160 receives on the PUSCH at least one PUSCH transmission based on the number of PUSCH repetitions. In a further particular embodiment, receiving the at least one PUSCH transmission on the PUSCH comprises receiving a plurality of periodic PUSCH transmissions on the PUSCH. In a further particular embodiment, the periodic PUSCH transmissions are on PURs.

Figure 24:
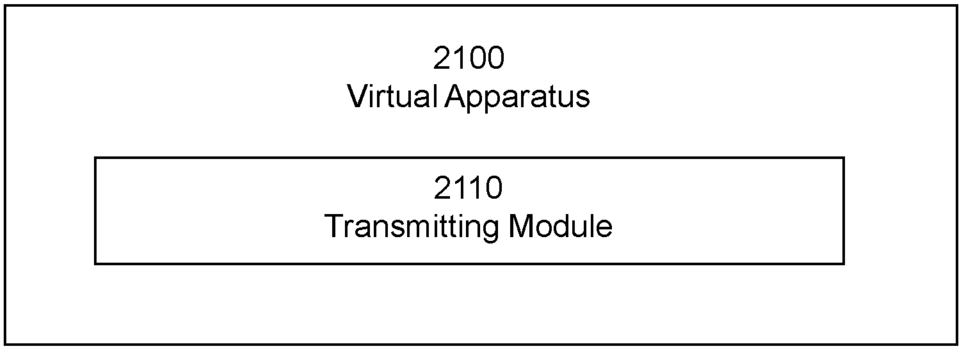
FIG. 24 illustrates another example virtual apparatus, according to certain embodiments.

FIG. 24 illustrates a schematic block diagram of another virtual apparatus 2100 in a wireless network (for example, the wireless network shown in FIG. 2). The apparatus may be implemented in a wireless device or network node (e.g., wireless device 110 or network node 160 shown in FIG. 2). Apparatus 2100 is operable to carry out the example method described with reference to FIG. 23 and possibly any other processes or methods disclosed herein. It is also to be understood that the method of FIG. 23 is not necessarily carried out solely by apparatus 100. At least some operations of the method can be performed by one or more other entities.

Virtual Apparatus 2100 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 2110 and any other suitable units of apparatus 2100 to perform corresponding functions according one or more embodiments of the present disclosure.

According to certain embodiments, transmitting module 2110 may perform certain of the transmitting functions of the apparatus 2100. For example, transmitting module 2110 may transmit, to a lower layer of a wireless device 110, a message comprising a 3 bit indicator associated with a number of PUSCH repetitions to be used by the wireless device 110 for transmitting on a PUSCH, regardless of whether ce-pdsch-puschEnhancement-config is configured by a higher layer.

EXAMPLE EMBODIMENTS

Example Embodiment 1. A method performed by a wireless device, the method comprising: receiving, from the network node, a first message comprising a 3 bit indicator associated with a first number of Physical Uplink Shared Channel (PUSCH) repetitions to be used by the wireless device for a first instance of a PUSCH transmission; and receiving a second message comprising a 2 bit indicator to determine a second number of PUSCH repetitions to be used by the wireless device for one or more subsequent instances of the PUSCH transmission based on said second number of PUSCH repetitions.

Example Embodiment 2. The method of Embodiment 1, wherein the first message comprises a radio resource control (RRC) message associated with an RRC configuration, and the method further comprises storing the 3 bit indicator associated with the RRC configuration.

Example Embodiment 3. The method of Embodiment 2, further comprising: mapping the 2 bit indicator associated with the second message to an updated 3 bit indicator based on said second number of PUSCH repetitions; and updating the RRC configuration by replacing the 3 bit indicator associated with the first message with the updated 3 bit indicator; and storing the updated RRC configuration.

Example Embodiment 4. The method of Embodiment 3, wherein the mapping step is performed by a physical layer and the updating and storing steps are performed by a higher layer.

Example Embodiment 5. The method of any one of Embodiments 1 to 2, further comprising: mapping the 2 bit indicator to an updated 3 bit indicator; and replacing the 3 bit indicator with the updated 3 bit indicator in a configuration.

Example Embodiment 6. The method of Embodiment 5, wherein replacing the 3 bit indicator with the updated 3 bit indicator in the configuration comprises: transmitting, by a physical layer, the updated 3-bit indicator to a higher layer; receiving, by the higher layer, the updated 3-bit indicator; and storing, by the higher layer, the updated 3 bit indicator in the configuration.

Example Embodiment 7. The method of any one of Embodiments 3 to 6, wherein mapping the 2 bit indicator to the updated 3 bit indicator comprises applying, for example, a zero-bit padding to the 2 bit indicator to obtain the updated 3 bit indicator.

Example Embodiment 8. The method of Embodiment 7, wherein applying the zero-bit padding comprises adding a 0 bit in front or at the end of the 2 bit indicator.

Example Embodiment 9. The method of Embodiment 7, wherein applying the zero-bit padding comprises setting a most significant bit to zero.

Example Embodiment 10. The method of Embodiment 7, wherein applying the zero-bit padding comprises setting a least significant bit to zero.

Example Embodiment 11. The method of any one of Embodiments 3 to 6, wherein for at least one of a PUSCH repetition adjustment field and a Repetition number field in the second message, mapping the 2 bit indicator to the updated 3 bit indicator comprises obtaining new PUSCH repetition levels Table when the cyclic redundancy check (CRC) of the downlink control information (DCI) is scrambled by a preconfigured uplink resource (PUR) Cell-Radio Network Temporary Identifier (C-RNTI, the new PUSCH repetitions levels Table comprising:

| Higher layer parameter 'pusch-maxNumRepetitionCEmodeA' | {n1, n2, n3, n4, n5, n6, n7, n8} |
|---|---|
| Not configured | {1, 2, 4, 8, reserved, reserved, reserved, reserved} |
| 16 | {1, 4, 8, 16, reserved, reserved, reserved, reserved} |
| 32 | {1, 4, 16, 32, reserved, reserved, reserved, reserved} |

Example Embodiment 12. The method of any one of Embodiments 1 to 11, wherein the second message comprises a downlink control information (DCI) message using Format 6-0A or Format 6-0B.

Example Embodiment 13. The method of Embodiment 12, wherein the DCI message comprises an acknowledgement message or a fallback indicator message.

Example Embodiment 14. The method of any one of Embodiments 1 to 13, wherein the first message is received via L2/L3 signaling and the second message is received via L1 signaling (i.e., using DCI).

Example Embodiment 15. The method of any one of Embodiments 1 to 14, further comprising, prior to receiving the second message from the network node that comprises the 3 bit indicator, transmitting the first instance of a PUSCH transmission based on the first number of PUSCH repetitions, and wherein the second message comprising the 3 bit indicator is a response message.

Example Embodiment 16. The method of any one of Embodiments 1 to 15, wherein the 3 bit indicator in the second message is comprised by the following set of values {1, 2, 4, 8, 12, 16, 24, 32} to determine the number of repetitions in one or more subsequent instances of PUSCH transmissions on PUR.

Example Embodiment 17. The method of any one of Embodiments 1 to 15, wherein the 3 bit indicator in the second message is selected from a set of values comprising {1, 2, 4, 8, 12, 16, 24, 32}, the method further comprising using the 3 bit indicator to determine the number of repetitions in one or more subsequent instances of PUSCH transmissions.

Example Embodiment 18. The method of any one of Embodiments 16 to 17, wherein a ce-pdsch-puschEnhancement-config is not configured by the first message and at least one of a PUSCH repetition adjustment field and a repetition number field in the second message comprises a 3 bit indicator when the cyclic redundancy check (CRC) of the downlink control information (DCI) is scrambled by a preconfigured uplink resource (PUR) Cell-Radio Network Temporary Identifier (C-RNTI).

Example Embodiment 19. The method of any one of Embodiments 16 to 17, wherein a ce-pdsch-puschEnhancement-config is configured by the first message and at least one of a PUSCH repetition adjustment field and a repetition number field in the second message comprises a 3 bit indicator when the cyclic redundancy check (CRC) of the downlink control information (DCI) is scrambled by a preconfigured uplink resource (PUR) Cell-Radio Network Temporary Identifier (C-RNTI).

Example Embodiment 20. The method of any one of Embodiments 1 to 19, wherein a set of values based on the first number of repetitions is defined, wherein the set of values comprises at least a first value associated with the first number of repetitions, and the method further comprises selecting a second value associated with the second number of repetitions from the set of values.

Example Embodiment 21. The method of Embodiment 20, wherein the second value associated with the second number of repetitions is larger than the first value associated with the first number of repetitions.

Example Embodiment 22. The method of Embodiment 20, wherein the second value associated with the second number of repetitions is smaller than the first value associated with the first number of repetitions.

Example Embodiment 23. The method of any one of Embodiments 1 to 22, further comprising transmitting the one or more subsequent instances on the PUSCH based on said second number of PUSCH repetitions.

Example Embodiment 24. The method of any one of Embodiments 1 to 23, wherein the first instance of the PUSCH transmission and the subsequent instances on the PUSCH transmission comprises periodic PUSCH transmissions.

Example Embodiment 25. The method of Embodiment 24, wherein the periodic PUSCH transmissions are on preconfigured uplink resources (PUR).

Example Embodiment 26. A computer program comprising instructions which when executed on a computer perform any of the methods of embodiments 1 to 25.

Example Embodiment 27. A computer program product comprising computer program, the computer program comprising instructions which when executed on a computer perform any of the methods of embodiments 1 to 25.

Example Embodiment 28. A non-transitory computer readable medium storing instructions which when executed by a computer perform any of the methods of embodiments 1 to 25.

Group A2 Embodiments

Example Embodiment 29. A method performed by a wireless device, the method comprising: receiving, by a lower layer, a message from the network node, the message comprising a 3 bit indicator associated with a number of Physical Uplink Shared Channel (PUSCH) repetitions to be used by the wireless device for transmitting on a PUSCH, regardless of whether ce-pdsch-puschEnhancement-config is configured by a higher layer.

Example Embodiment 30. The method of Embodiment 29, wherein the message received by the lower layer comprises a radio resource control (RRC) message received via L2/L3 signaling.

Example Embodiment 31. The method of Embodiment 29, wherein the message comprises a downlink control information (DCI) message received via L1 signaling.

Example Embodiment 32. The method of Embodiment 31, wherein the DCI message comprises an acknowledgement message or a fallback indicator message.

Example Embodiment 33. The method of any one of Embodiments 29 to 32, further comprising transmitting the 3-bit indicator to the higher layer for updating of a RRC configuration to include the 3 bit indicator.

Example Embodiment 34. The method of Embodiment 33, further comprising storing, by the higher layer, the 3-bit indicator with the RRC configuration.

Example Embodiment 35. The method of any one of Embodiments 29 to 34, further comprising transmitting on the PUSCH based on the number of PUSCH repetitions.

Example Embodiment 36. The method of Embodiment 35, wherein transmitting on the PUSCH comprises transmitting a plurality of periodic PUSCH transmissions on the PUSCH.

Example Embodiment 37. The method of Embodiment 36, wherein the periodic PUSCH transmissions are on preconfigured uplink resources (PUR).

Example Embodiment 38. A computer program comprising instructions which when executed on a computer perform any of the methods of Embodiments 29 to 37.

Example Embodiment 39. A computer program product comprising computer program, the computer program comprising instructions which when executed on a computer perform any of the methods of Embodiments 29 to 37.

Example Embodiment 40. A non-transitory computer readable medium storing instructions which when executed by a computer perform any of the methods of Embodiments 29 to 37.

Group B1 Embodiments

Example Embodiment 41. A method performed by a network node, the method comprising: transmitting, to a wireless device, a first message comprising a 3 bit indicator associated with a first number of Physical Uplink Shared Channel (PUSCH) repetitions to be used by the wireless device for a first instance of a PUSCH transmission; and transmitting, to the wireless device, a second message comprising a 2 bit indicator to determine a second number of PUSCH repetitions to be used by the wireless device for one or more subsequent instances of the PUSCH transmission based on said second number of PUSCH repetitions.

Example Embodiment 42. The method of Embodiment 41, wherein the first message comprises a radio resource control (RRC) message associated with an RRC configuration, and the method further comprises storing the 3 bit indicator associated with the RRC configuration.

Example Embodiment 43. The method of Embodiment 42, further comprising: mapping the 2 bit indicator associated with the second message to an updated 3 bit indicator based on said second number of PUSCH repetitions; and updating the RRC configuration by replacing the 3 bit indicator associated with the first message with the updated 3 bit indicator; and storing the updated RRC configuration.

Example Embodiment 44. The method of any one of Embodiments 42 to 43, further comprising configuring the wireless device to: map the 2 bit indicator associated with the second message to an updated 3 bit indicator based on said second number of PUSCH repetitions; and update the RRC configuration by replacing the 3 bit indicator associated with the first message with the updated 3 bit indicator; and store the updated RRC configuration.

Example Embodiment 45. The method of any one of Embodiments 43 to 44, wherein the mapping step is performed by a physical layer and the updating and storing steps are performed by a higher layer.

Example Embodiment 46. The method of any one of Embodiments 41 to 42, further comprising: mapping the 2 bit indicator to an updated 3 bit indicator; and replacing the 3 bit indicator with the updated 3 bit indicator in a configuration.

Example Embodiment 47. The method of any one of Embodiments 41 to 42, further comprising configuring the wireless device to: map the 2 bit indicator to an updated 3 bit indicator; and replace the 3 bit indicator with the updated 3 bit indicator in a configuration.

Example Embodiment 48. The method of any one of Embodiments 46 to 47, wherein replacing the 3 bit indicator with the updated 3 bit indicator in the configuration comprises: transmitting, by a physical layer, the updated 3-bit indicator to a higher layer, receiving, by the higher layer, the updated 3-bit indicator; and storing, by the higher layer, the updated 3 bit indicator in the configuration.

Example Embodiment 49. The method of any one of Embodiments 43 to 47, wherein mapping the 2 bit indicator to the updated 3 bit indicator comprises applying, for example, a zero-bit padding to the 2 bit indicator to obtain the updated 3 bit indicator.

Example Embodiment 50. The method of Embodiment 49, wherein applying the zero-bit padding comprises adding a 0 bit in front or at the end of the 2 bit indicator.

Example Embodiment 51. The method of Embodiment 49, wherein applying the zero-bit padding comprises setting a most significant bit to zero.

Example Embodiment 52. The method of Embodiment 49, wherein applying the zero-bit padding comprises setting a least significant bit to zero.

Example Embodiment 53. The method of any one of Embodiments 43 to 47, wherein for at least one of a PUSCH repetition adjustment field and a Repetition number field in the second message, mapping the 2 bit indicator to the updated 3 bit indicator comprises obtaining a new PUSCH repetition levels Table when the cyclic redundancy check (CRC) of the downlink control information (DCI) is scrambled by a preconfigured uplink resource (PUR) Cell-Radio Network Temporary Identifier (C-RNTI, the new PUSCH repetitions levels Table comprising:

| Higher layer parameter 'pusch-maxNumRepetitionCEmodeA' | {n1, n2, n3, n4, n5, n6, n7, n8} |
|---|---|
| Not configured | {1, 2, 4, 8, reserved, reserved, reserved, reserved} |
| 16 | {1, 4, 8, 16, reserved, reserved, reserved, reserved} |
| 32 | {1, 4, 16, 32, reserved, reserved, reserved, reserved} |

Example Embodiment 54. The method of any one of Embodiments 41 to 53, wherein the second message comprises a downlink control information (DCI) message using Format 6-0A or Format 6-0B.

Example Embodiment 55. The method of Embodiment 54, wherein the DCI message comprises an acknowledgement message or a fallback indicator message.

Example Embodiment 56. The method of any one of Embodiments 41 to 55, wherein the first message is received via L2/L3 signaling and the second message is received via L1 signaling.

Example Embodiment 57. The method of any one of Embodiments 41 to 56, further comprising, prior to receiving the second message from the network node that comprises the 3 bit indicator, transmitting the first instance of a PUSCH transmission based on the first number of PUSCH repetitions, and wherein the second message comprising the 3 bit indicator is a response message.

Example Embodiment 58. The method of any one of Embodiments 41 to 57, wherein the 3 bit indicator in the second message is comprised by the following set of values {1, 2, 4, 8, 12, 16, 24, 32} to determine the number of repetitions in one or more subsequent instances of PUSCH transmissions on PUR.

Example Embodiment 59. The method of any one of Embodiments 41 to 57, wherein the 3 bit indicator in the second message is selected from a set of values comprising {1, 2, 4, 8, 12, 16, 24, 32}, the method further comprising using the 3 bit indicator to determine the number of repetitions in one or more subsequent instances of PUSCH transmissions.

Example Embodiment 60. The method of any one of Embodiments 58 to 59, wherein a ce-pdsch-puschEnhancement-config is not configured by the first message and at least one of a PUSCH repetition adjustment field and a repetition number field in the second message comprises a 3 bit indicator when the cyclic redundancy check (CRC) of the downlink control information (DCI) is scrambled by a preconfigured uplink resource (PUR) Cell-Radio Network Temporary Identifier (C-RNTI).

Example Embodiment 61. The method of any one of Embodiments 58 to 59, wherein a ce-pdsch-puschEnhancement-config is configured by the first message and at least one of a PUSCH repetition adjustment field and a repetition number field in the second message comprises a 3 bit indicator when the cyclic redundancy check (CRC) of the downlink control information (DCI) is scrambled by a preconfigured uplink resource (PUR) Cell-Radio Network Temporary Identifier (C-RNTI).

Example Embodiment 62. The method of any one of Embodiments 41 to 61, wherein a set of values based on the first number of repetitions is defined, wherein the set of values comprises at least a first value associated with the first number of repetitions, and the method further comprises selecting a second value associated with the second number of repetitions from the set of values.

Example Embodiment 63. The method of Embodiment 62, wherein the second value associated with the second number of repetitions is larger than the first value associated with the first number of repetitions.

Example Embodiment 63. The method of Embodiment 62, wherein the second value associated with the second number of repetitions is smaller than the first value associated with the first number of repetitions.

Example Embodiment 64. The method of any one of Embodiments 41 to 63, further comprising receiving the one or more subsequent instances on the PUSCH based on said second number of PUSCH repetitions.

Example Embodiment 65. The method of any one of Embodiments 1 to 64, wherein the first instance of the PUSCH transmission and the subsequent instances on the PUSCH transmission comprises periodic PUSCH transmissions.

Example Embodiment 66. The method of Embodiment 65, wherein the periodic PUSCH transmissions are on preconfigured uplink resources (PUR).

Example Embodiment 67. A computer program comprising instructions which when executed on a computer perform any of the methods of embodiments 41 to 66.

Example Embodiment 68. A computer program product comprising computer program, the computer program comprising instructions which when executed on a computer perform any of the methods of embodiments 41 to 66.

Example Embodiment 69. A non-transitory computer readable medium storing instructions which when executed by a computer perform any of the methods of embodiments 41 to 66.

Group B2 Embodiments

Example Embodiment 70. A method performed by a network node, the method comprising: transmitting, to a lower layer of a wireless device, a message comprising a 3 bit indicator associated with a number of Physical Uplink Shared Channel (PUSCH) repetitions to be used by the wireless device for transmitting on a PUSCH, regardless of whether ce-pdsch-puschEnhancement-config is configured by a higher layer.

Example Embodiment 71. The method of Embodiment 70, wherein the message received by the lower layer comprises a radio resource control (RRC) message received via L2/L3 signaling.

Example Embodiment 72. The method of Embodiment 70, wherein the message comprises a downlink control information (DCI) message received via L1 signaling.

Example Embodiment 73. The method of Embodiment 71, wherein the DCI message comprises an acknowledgement message or a fallback indicator message.

Example Embodiment 74. The method of any one of Embodiments 70 to 73, further comprising configuring the wireless device to transmit the 3-bit indicator to the higher layer for updating of a RRC configuration to include the 3 bit indicator.

Example Embodiment 75. The method of Embodiment 74, further comprising configuring the wireless device to store, by the higher layer, the 3-bit indicator with the RRC configuration.

Example Embodiment 76. The method of any one of Embodiments 70 to 75, further comprising transmitting the 3-bit indicator to the higher layer for updating of a RRC configuration to include the 3 bit indicator.

Example Embodiment 77. The method of Embodiment 76, further comprising storing, by the higher layer, the 3-bit indicator with the RRC configuration.

Example Embodiment 78. The method of any one of Embodiments 70 to 77, further comprising receiving on the PUSCH at least one PUSCH transmission based on the number of PUSCH repetitions.

Example Embodiment 79. The method of Embodiment 78, wherein receiving the at least one PUSCH transmission on the PUSCH comprises receiving a plurality of periodic PUSCH transmissions on the PUSCH.

Example Embodiment 80. The method of Embodiment 79, wherein the periodic PUSCH transmissions are on preconfigured uplink resources (PUR).

Example Embodiment 81. A computer program comprising instructions which when executed on a computer perform any of the methods of Embodiments 70 to 80.

Example Embodiment 82. A computer program product comprising computer program, the computer program comprising instructions which when executed on a computer perform any of the methods of Embodiments 70 to 80.

Example Embodiment 83. A non-transitory computer readable medium storing instructions which when executed by a computer perform any of the methods of Embodiments 70 to 80.

Group C Embodiments

Example Embodiment 84. A wireless device comprising: processing circuitry configured to perform any of the steps of any of the Group A1 and A2 embodiments.

Example Embodiment 85. A wireless device comprising: processing circuitry configured to perform any of the steps of any of the Group A1 and A2 embodiments; and power supply circuitry configured to supply power to the wireless device.

Example Embodiment 86. A network node comprising: processing circuitry configured to perform any of the steps of any of the Group B1 and B2 embodiments.

Example Embodiment 87. A network node comprising: processing circuitry configured to perform any of the steps of any of the Group B1 and B2 embodiments; power supply circuitry configured to supply power to the wireless device.

Example Embodiment 88. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A1 and A2 embodiments; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

Example Embodiment 89. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of the Group B1 and B2 embodiments.

Example Embodiment 90. The communication system of the pervious embodiment further including the network node.

Example Embodiment 91. The communication system of the previous 2 embodiments, further including the wireless device, wherein the wireless device is configured to communicate with the network node.

Example Embodiment 92. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment 93. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of the Group B1 and B2 embodiments.

Example Embodiment 94. The method of the previous embodiment, further comprising, at the network node, transmitting the user data.

Example Embodiment 95. The method of the previous 2 embodiments, wherein the user data is provided at the host computer by executing a host application, the method further comprising, at the wireless device, executing a client application associated with the host application.

Example Embodiment 96. A wireless device configured to communicate with a network node, the wireless device comprising a radio interface and processing circuitry configured to performs the of the previous 3 embodiments.

Example Embodiment 97. A communication system including a host computer comprising: processing circuitry configured to provide user data; and a communication interface configured to forward user data to a cellular network for transmission to a wireless device, wherein the wireless device comprises a radio interface and processing circuitry, the wireless device's components configured to perform any of the steps of any of the Group A1 and A2 embodiments.

Example Embodiment 98. The communication system of the previous embodiment, wherein the cellular network further includes a network node configured to communicate with the wireless device.

Example Embodiment 99. The communication system of the previous 2 embodiments, wherein: the processing circuitry of the host computer is configured to execute a host application, thereby providing the user data; and the wireless device's processing circuitry is configured to execute a client application associated with the host application.

Example Embodiment 100. A method implemented in a communication system including a host computer, a network node and a wireless device, the method comprising: at the host computer, providing user data; and at the host computer, initiating a transmission carrying the user data to the wireless device via a cellular network comprising the network node, wherein the wireless device performs any of the steps of any of the Group A1 and A2 embodiments.

Example Embodiment 101. The method of the previous embodiment, further comprising at the wireless device, receiving the user data from the network node.

Example Embodiment 102. A communication system including a host computer comprising: communication interface configured to receive user data originating from a transmission from a wireless device to a network node, wherein the wireless device comprises a radio interface and processing circuitry, the wireless device's processing circuitry configured to perform any of the steps of any of the Group A1 and A2 embodiments.

Example Embodiment 103. The communication system of the previous embodiment, further including the wireless device.

Example Embodiment 104. The communication system of the previous 2 embodiments, further including the network node, wherein the network node comprises a radio interface configured to communicate with the wireless device and a communication interface configured to forward to the host computer the user data carried by a transmission from the wireless device to the network node.

Example Embodiment 105. The communication system of the previous 3 embodiments, wherein: the processing circuitry of the host computer is configured to execute a host application; and the wireless device's processing circuitry is configured to execute a client application associated with the host application, thereby providing the user data.

Example Embodiment 106. The communication system of the previous 4 embodiments, wherein: the processing circuitry of the host computer is configured to execute a host application, thereby providing request data; and the wireless device's processing circuitry is configured to execute a client application associated with the host application, thereby providing the user data in response to the request data.

Example Embodiment 107. A method implemented in a communication system including a host computer, a network node and a wireless device, the method comprising: at the host computer, receiving user data transmitted to the network node from the wireless device, wherein the wireless device performs any of the steps of any of the Group A1 and A2 embodiments.

Example Embodiment 108. The method of the previous embodiment, further comprising, at the wireless device, providing the user data to the network node.

Example Embodiment 109. The method of the previous 2 embodiments, further comprising: at the wireless device, executing a client application, thereby providing the user data to be transmitted; and at the host computer, executing a host application associated with the client application.

Example Embodiment 110. The method of the previous 3 embodiments, further comprising: at the wireless device, executing a client application; and at the wireless device, receiving input data to the client application, the input data being provided at the host computer by executing a host application associated with the client application, wherein the user data to be transmitted is provided by the client application in response to the input data.

Example Embodiment 111. A communication system including a host computer comprising a communication interface configured to receive user data originating from a transmission from a wireless device to a network node, wherein the network node comprises a radio interface and processing circuitry, the network node's processing circuitry configured to perform any of the steps of any of the Group B1 and B2 embodiments.

Example Embodiment 112. The communication system of the previous embodiment further including the network node.

Example Embodiment 113. The communication system of the previous 2 embodiments, further including the wireless device, wherein the wireless device is configured to communicate with the network node.

Example Embodiment 114. The communication system of the previous 3 embodiments, wherein: the processing circuitry of the host computer is configured to execute a host application; the wireless device is configured to execute a client application associated with the host application, thereby providing the user data to be received by the host computer.

Example Embodiment 115. A method implemented in a communication system including a host computer, a network node and a wireless device, the method comprising: at the host computer, receiving, from the base station, user data originating from a transmission which the network node has received from the wireless device, wherein the wireless device performs any of the steps of any of the Group A1 and A2 embodiments.

Example Embodiment 116. The method of the previous embodiment, further comprising at the network node receiving the user data from the wireless device.

Example Embodiment 117. The method of the previous 2 embodiments, further comprising at the network node, initiating a transmission of the received user data to the host computer.

Example Embodiment 118. The method of any of the previous embodiments, wherein the network node comprises a base station.

Example Embodiment 119. The method of any of the previous embodiments, wherein the wireless device comprises a user equipment (UE).

In summary, certain embodiments disclosed herein propose the following solutions:

Case 1: PUR when ce-pdsch-puschEnhancement-config is not configured by HL

| 2/3-bit solution*(i.e., 2-bits combined with the usage of 3-bits when applicable)* from a RAN1 perspective | 3-bit solution*(i.e., Always 3-bits)* from a RAN1 perspective |
|---|---|
| ○ In case of L1 ACK/Fallback indicator:<br>■ PUSCH repetition adjustment - 2 bits pointing to Table 8-2b: PUSCH repetition levels (DCI Format 6-0A)<br>○ In case of UL-Grant:<br>■ Repetition number - 2 bits field applies pointing to Table 8-2b: PUSCH repetition levels (DCI Format 6-0A) | ○ In case of L1 ACK/Fallback indicator:<br>■ PUSCH repetition adjustment - 3 bits<br>Option 1: The field keeps pointing to the 2-bit legacy Table 8-2b, and Zero-bit padding is applied to pass from 2-bits to 3-bits.<br>Option 2: The field Points out to a NEW 3-bit Table 8-2b-1: PUSCH repetition levels (DCI Format 6-0A)<br>○ In case of UL-Grant:<br>■ Repetition number - 3 bits<br>Option 1: The field keeps pointing to the 2-bit legacy Table 8-2b, and Zero-bit padding is applied to pass from 2-bits to 3-bits.<br>Option 2: The field points out to a NEW 3-bit Table 8-2b-1: PUSCH repetition levels (DCI Format 6-0A) |

Case 2: PUR when ce-pdsch-puschEnhancement-config is configured by HL

Alt-1: When Ce-Pdsch-puschEnhancement-Config is NOT Supported by the L1 ACK/Fallback Indicator

| 2/3-bit solution*(i.e., 2-bits combined with the usage of 3-bits when applicable)* from a RAN1 perspective | 3-bit solution*(i.e., Always 3-bits)* from a RAN1 perspective |
|---|---|
| ○ In case of L1 ACK/Fallback indicator:<br>■ PUSCH repetition adjustment - 2 bits pointing to Table 8- | ○ In case of L1 ACK/Fallback indicator:<br>PUSCH repetition adjustment - 3 bits<br>Option 1: The field |

-continued

| 2/3-bit solution(i.e., 2-bits combined with the usage of 3-bits when applicable) from a RAN1 perspective | 3-bit solution(i.e., Always 3-bits) from a RAN1 perspective |
| --- | --- |
| 2b: PUSCH repetition levels (DCI Format 6-0A)<br>○ In case of UL-Grant:<br>■ Repetition number - 3 bits field applies, the bit combination per-se refers to one value in the following set {1,2,4,8,12,16,24,32}. | keeps pointing to the 2-bit legacy Table 8-2b, and zero-bit padding is applied to pass from 2-bits to 3-bits.<br>Option 2: The field points out to a NEW 3-bit Table 8-2b-1: PUSCH repetition levels (DCI Format 6-0A)<br>■<br>○ In case of UL-Grant:<br>■ Repetition number - 3 bits field applies, the bit combination per-se refers to one value in the following set {1,2,4,8,12,16,24,32}. |

Alt-2: When Ce-Pdsch-puschEnhancement-Config is Supported by the L1 ACK/Fallback Indicator

| 2/3-bit solution(i.e., 2-bits combined with the usage of 3-bits when applicable) from a RAN1 perspective | 3-bit solution(i.e., Always 3-bits) from a RAN1 perspective |
| --- | --- |
| ○ In case of L1 ACK/Fallback indicator:<br>■ PUSCH repetition adjustment - 3 bits field applies, the bit combination per-se refers to one value in the following set {1,2,4,8,12,16,24,32}.<br>○ In case of UL-Grant:<br>■ Repetition number - 3 bits field applies, the bit combination per-se refers to one value in the following set {1,2,4,8,12,16,24,32}. | ○ In case of L1 ACK/Fallback indicator:<br>■ PUSCH repetition adjustment - 3 bits field applies, the bit combination per-se refers to one value in the following set {1,2,4,8,12,16,24,32}.<br>○ In case of UL-Grant:<br>■ Repetition number - 3 bits field applies, the bit combination per-se refers to one value in the following set {1,2,4,8,12,16,24,32}. |

In another embodiment, as an alternative solution, for PUR the PUSCH repetition adjustment field used by the L1 ACK/Fallback indicator makes use of 3-bits by either keeping or disestablishing the relation with the Broadcasted maximum number of PUSCH repetitions for CE Mode A. If the relation to the Broadcasted maximum number of PUSCH repetitions for CE Mode A is kept, then if the broadcasted higher layer parameter 'pusch-maxNumRepetitionCEmodeA' equals 32, then the 3-bits in the "PUSCH repetition adjustment field" in DCI refers to {1, 4, 16, 32, reserved, reserved, reserved, reserved}. In case the broadcasted higher layer parameter 'pusch-maxNumRepetitionCEmodeA' were disestablished the 3-bit combination per-se refers to one value in the following set {1, 2, 4, 8, 12, 16, 24, 32}.

In another embodiment, it can be defined that for PUR both the "PUSCH repetition adjustment" field and the "Repetition number" field always use 3-bits using the set {1, 2, 4, 8, 12, 16, 24, 32} regardless of whether ce-pdsch-puschEnhancement-config is configured by higher layers.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a wireless device, the method comprising:

receiving, from the network node, a first message comprising a downlink control information (DCI) message using Format 6-0A or Format 6-0B and a 3 bit indicator associated with a first number of Physical Uplink Shared Channel (PUSCH) repetitions to be used by the wireless device for a first instance of a PUSCH transmission;

receiving a second message comprising a DCI message using Format 6-0A or Format 6-0B and a 2 bit indicator for determining a second number of PUSCH repetitions to be used by the wireless device for one or more subsequent instances of the PUSCH transmission based on said second number of PUSCH repetitions;

applying a zero-bit padding to the 2 bit indicator to obtain an updated 3 bit indicator used to communicate from a physical layer to higher layers the second number of PUSCH repetitions to be used; and sending the one or more subsequent PUSCH transmissions based on the second number of PUSCH repetitions.

2. The method of claim 1, further comprising:

storing the updated RRC configuration, wherein the storing steps are performed by a higher layer.

3. The method of claim 1, further comprising:

replacing the 3 bit indicator stored in the higher layer configuration with the updated 3 bit indicator resulting from applying the zero-bit padding, wherein the step of applying the zero-bit padding is performed by a physical layer.

4. The method of claim 3, wherein replacing the 3 bit indicator stored in the higher layer configuration with the updated 3 bit indicator resulting from applying the zero-bit padding in the physical layer comprises:

applying a zero-bit padding at the physical layer to obtain an updated 3 bit indicator to communicate to higher layers the second number of PUSCH repetitions to be used, receiving, by the higher layer, the updated 3 bit indicator; and storing, by the higher layer, the updated 3 bit indicator in the configuration.

5. The method of claim 1, wherein applying the zero-bit padding comprises adding a 0 bit in front of the 2 bit indicator associated to the second message.

6. The method of claim 5, wherein applying the zero-bit padding comprises setting a most significant bit to zero.

7. The method of claim 1, wherein the second DCI message comprises an acknowledgement message or a fallback indicator message.

8. The method of claim 1, wherein the first message is received via Layer 2/Layer 3, L2/L3, signaling and the second message is received via Layer 1, L1, signaling.

9. The method of claim 1, wherein the 2 bit indicator in the second message is comprised by the following sets of values {1, 2, 4, 8}, or {1, 4, 8, 16}, or {1, 4, 16, 32} to determine the number of repetitions in one or more subsequent instances of PUSCH transmissions on at least one Preconfigured Uplink Resource, PUR.

10. The method of claim 1, wherein a set of values based on the first number of repetitions is defined, wherein the set of values comprises at least a first value associated with the first number of repetitions, and the method further comprises selecting a second value associated with the second number of repetitions from the set of values.

11. The method of claim 10, wherein the second value associated with the second number of repetitions is larger than the first value associated with the first number of repetitions.

12. The method of claim 10, wherein the second value associated with the second number of repetitions is smaller than the first value associated with the first number of repetitions.

13. The method of claim 1, wherein the first number of repetitions or the second number of repetitions is one of 1, 2, 4, 8, 12, 16, 24, and 32.

14. The method of claim 1, wherein the first instance of the PUSCH transmission and the subsequent instances on the PUSCH transmission comprises periodic PUSCH transmissions, and wherein the periodic PUSCH transmissions are on preconfigured uplink resources, PURs.

15. The method of claim 1, wherein the first message comprises a radio resource control (RRC) message associated with an RRC configuration, and the method further comprises storing the 3 bit indicator associated with the RRC configuration.

16. The method of claim 15, further comprising:

updating the RRC configuration by replacing the 3 bit indicator associated with the first message with the updated 3 bit indicator.

17. A method performed by a network node, the method comprising:

transmitting, to a wireless device, a first message comprising a downlink control information (DCI) message using Format 6-0A or Format 6-0B and a 3 bit indicator associated with a first number of Physical Uplink Shared Channel (PUSCH) repetitions to be used by the wireless device for a first instance of a PUSCH transmission;

transmitting, to the wireless device, a second message comprising a DCI message using Format 6-0A or Format 6-0B and a 2 bit indicator for determining a second number of PUSCH repetitions to be used by the wireless device for one or more subsequent instances of the PUSCH transmission based on said second number of PUSCH repetitions; and receiving, from the wireless device, the one or more subsequent PUSCH transmissions based on the second number of PUSCH repetitions.

18. The method of claim 17, further comprising:

replacing, in a configuration, the 3 bit indicator with the updated 3 bit indicator resulting from applying the zero-bit padding.

19. The method of claim 17, wherein the second DCI message comprises an acknowledgement message or a fallback indicator message.

20. The method of claim 17, wherein the first message is transmitted via Layer 2/Layer 3, L2/L3, signaling and the second message is transmitted via Layer 1, L1, signaling.

21. The method of claim 17, wherein the 2 bit indicator in the second message is comprised by the following sets of values {1, 2, 4, 8}, or {1, 4, 8, 16}, or {1, 4, 16, 32} to determine the number of repetitions in one or more subsequent instances of PUSCH transmissions on at least one Preconfigured Uplink Resource, PUR.

* * * * *